(12) United States Patent
Zhang et al.

(10) Patent No.: US 12,504,582 B2
(45) Date of Patent: Dec. 23, 2025

(54) THIN FILM LITHIUM CONTAINING MODULATOR HAVING TIGHT BENDS

(71) Applicant: HyperLight Corporation, Cambridge, MA (US)

(72) Inventors: Mian Zhang, Cambridge, MA (US); Christian Reimer, Wellesley, MA (US); Jeffrey Cole Holzgrafe, Somerville, MA (US)

(73) Assignee: HyperLight Corporation, Cambridge, MA (US)

( * ) Notice: Subject to any disclaimer, the term of this patent is extended or adjusted under 35 U.S.C. 154(b) by 0 days.

(21) Appl. No.: 19/069,057

(22) Filed: Mar. 3, 2025

(65) Prior Publication Data

US 2025/0208346 A1    Jun. 26, 2025

Related U.S. Application Data

(63) Continuation-in-part of application No. 18/991,092, filed on Dec. 20, 2024.

(60) Provisional application No. 63/561,207, filed on Mar. 4, 2024, provisional application No. 63/613,580, filed on Dec. 21, 2023.

(51) Int. Cl.
*G02B 6/125* (2006.01)
*G02F 1/035* (2006.01)
*G02B 6/12* (2006.01)

(52) U.S. Cl.
CPC ............ *G02B 6/125* (2013.01); *G02F 1/035* (2013.01); *G02B 2006/1204* (2013.01); *G02B 2006/12045* (2013.01); *G02B 2006/12097* (2013.01)

(58) Field of Classification Search
CPC .......... G02B 6/125; G02B 2006/12119; G02F 2201/063
See application file for complete search history.

(56) References Cited

U.S. PATENT DOCUMENTS 4,999,686 A * 3/1991 Autier ................... G02B 6/125
                                                                 385/144
7,529,455 B2   5/2009 Suzuki
(Continued)

FOREIGN PATENT DOCUMENTS

CN    112630885        4/2021
CN    112835214 A  *   5/2021    ............... G02F 1/03
(Continued)

OTHER PUBLICATIONS

Chen et al., High-efficiency thin-film lithium niobate modulator with highly confined optical modes, Optics Letters, vol. 48, No. 7, Apr. 1, 2023, pp. 1602-1605.
(Continued)

*Primary Examiner* — Robert Tavlykaev
(74) *Attorney, Agent, or Firm* — Van Pelt, Yi & James LLP

(57) ABSTRACT

A photonics device is described. The photonics devices include at least one electrode and a waveguide. The waveguide includes electro-optic material(s), a ridge, and a slab. A first portion of the waveguide is proximate to the electrode (s), while a second portion of the waveguide includes a bend. The ridge includes a first side and a second side opposite to the first side. Portions of the slab are proximate to the first side and the second side of the ridge in the first portion of the waveguide. A portion of the slab is omitted in the second portion of the waveguide.

19 Claims, 9 Drawing Sheets

(56) References Cited

U.S. PATENT DOCUMENTS

| | | | |
|---|---|---|---|
| 8,913,860 B2 | 12/2014 | Ushida | |
| 10,816,727 B1 * | 10/2020 | Bian | G02B 6/136 |
| 11,681,167 B2 * | 6/2023 | Thomas | H01S 5/026 |
| | | | 385/2 |
| 2011/0170825 A1 | 7/2011 | Spector | |
| 2015/0277042 A1 | 10/2015 | Goodwill | |
| 2020/0335945 A1 | 10/2020 | Clifton | |
| 2021/0116638 A1 * | 4/2021 | Bian | G02B 6/12004 |
| 2021/0255489 A1 | 8/2021 | Wang | |
| 2022/0026634 A1 | 1/2022 | Bahadori | |
| 2022/0252783 A1 | 8/2022 | Zhang | |
| 2023/0083232 A1 | 3/2023 | Toda | |
| 2024/0329306 A1 | 10/2024 | Kodama | |
| 2024/0329323 A1 * | 10/2024 | Shimura | G02B 6/272 |
| 2024/0377594 A1 | 11/2024 | Oka | |

FOREIGN PATENT DOCUMENTS

| | | | | |
|---|---|---|---|---|
| CN | 113540063 | * | 10/2021 | G02B 6/12 |
| CN | 112782805 | | 5/2022 | |
| CN | 112596161 | | 3/2023 | |
| CN | 115877506 | | 3/2023 | |
| CN | 116819682 | | 9/2023 | |
| CN | 116908962 | | 10/2023 | |
| CN | 117092749 A | * | 11/2023 | G02B 6/125 |
| JP | 2015090450 | | 5/2015 | |
| JP | 2017215526 | | 12/2017 | |
| WO | 2023054526 | | 4/2023 | |

OTHER PUBLICATIONS

He et al., Low-loss fiber-to-chip interface for lithium niobate photonic integrated circuits, Feb. 24, 2019, 5pgs.

Li et al., High density lithium niobate photonic integrated circuits, Nature Communications, Aug. 10, 2023, pp. 1-8.

Roeloffzen et al., Low-Loss Si3N4 TripleX Optical Waveguides: Technology and Applications Overview, IEEE Journal of Selected Topics in Quantum Electronics, vol. 24, No. 4, Jul./Aug. 2018, pp. 4400321-4400321.

Sacher et al., Tri-layer silicon nitride-on-silicon photonic platform for ultra-low-loss crossings and interlayer transitions, vol. 25, No. 25, Dec. 11, 2017, pp. 30862-30875.

Valdez et al., 110 GHZ, 110 mW hybrid silicon-lithium niobate Mach-Zehnder modulator, Scientific Reports, 2022, pp. 1-11.

Watanabe et al., Perpendicular Grating Coupler Based on a Blazed Antiback-Reflection Structure, Journal of Lightwave Technology, vol. 35, No. 21, Nov. 1, 2017, pp. 4663-4669.

* cited by examiner

THIN FILM LITHIUM CONTAINING MODULATOR HAVING TIGHT BENDS

CROSS REFERENCE TO OTHER APPLICATIONS

This application claims priority to U.S. Provisional Patent Application No. 63/561,207 entitled THIN FILM LITHIUM CONTAINING MODULATOR HAVING TIGHT BENDS filed Mar. 4, 2024, which is incorporated herein by reference for all purposes.

This application is a continuation in part of U.S. patent application Ser. No. 18/991,092 entitled MULTILAYER THIN FILM LITHIUM-CONTAINING OPTICAL DEVICES filed Dec. 20, 2024, which claims priority to U.S. Provisional Patent Application No. 63/613,580 entitled MULTILAYER THIN FILM LITHIUM-CONTAINING OPTICAL DEVICES filed Dec. 21, 2023, both of which are incorporated herein by reference for all purposes.

BACKGROUND OF THE INVENTION

Photonics devices, such as electro-optic devices, contain multiple optical components. For example, a single photonics device may include fiber-to-chip couplers, waveguides having different sections (e.g. straight sections and bends), optical modulators, polarization rotation beam splitter/combiners, mode converters, and/or other structures. Some of these optical components include other structures. For example, electro-optic modulators include electrodes carrying electric signal(s) that modulate the optical signal (e.g., through the electro-optic effect) in addition to the waveguide that carries the optical signal. The waveguide may have multiple arms for which the optical signal carried is modulated. As a result, the electro-optic modulator can modulate the phase, intensity and/or polarization of the optical signal traversing the waveguide.

The size of components, such as electro-optic modulators, is important for next generation I/O technologies. Thin-film lithium niobate (TFLN) or thin film lithium tantalate (TFLT) electro-optic modulators may have desirable characteristics, such as a large electro-optic effect. However, the TFLN, TFLT, and other electro-optic modulators may require substantial number of bends. For example, bends may be used in matching the velocity of the optical signal with the velocity of the microwave signal carried by the electrodes. For a larger mismatch in velocity, more and/or larger bends may be used. Moreover, the minimum bending radius that can be practically used is limited by optical losses. Generally, optical losses increase as the bending radius decreases. For example, TFLN modulators may have bending radius of greater than 50 micrometers. For a modulator that has four ninety degree bends, at least two hundred micrometers of the photonics device are occupied simply for the bends. The use of bends in combination with the large bending radius may be a barrier to more dense integration of electro-optic devices, such as TFLN and/or TFLT electro-optic modulators. Consequently, techniques for facilitating integration of electro-optic devices are desired.

BRIEF DESCRIPTION OF THE DRAWINGS

Various embodiments of the invention are disclosed in the following detailed description and the accompanying drawings.

DETAILED DESCRIPTION

Figure 1A:
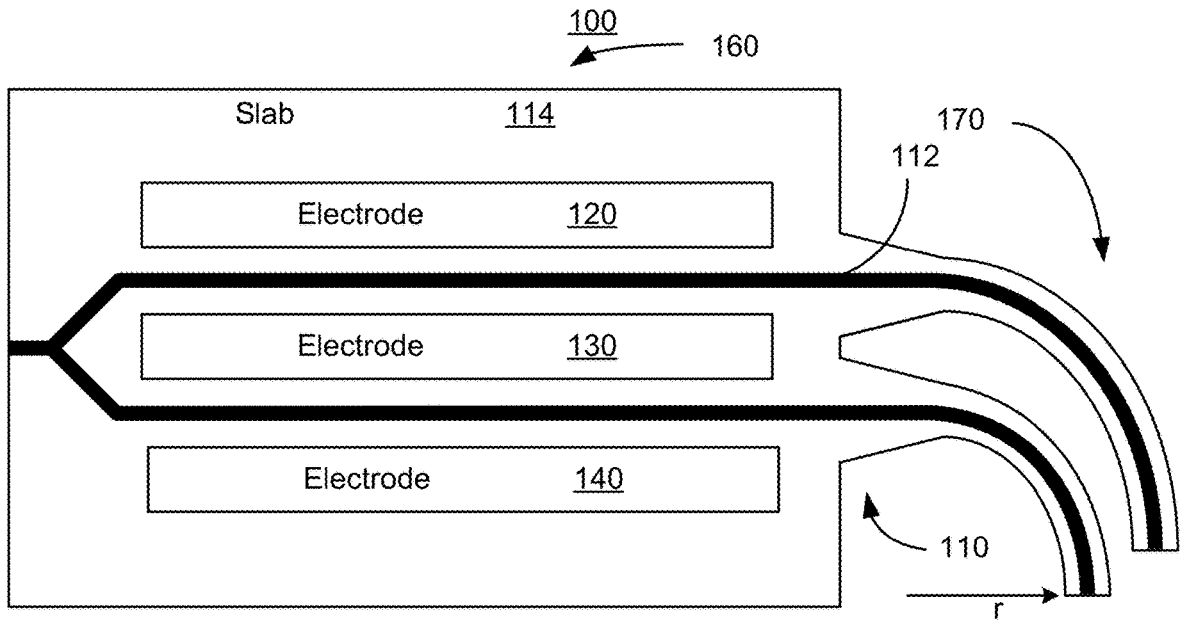
FIGS. 1A-1D depict an embodiment of a photonics device using electro-optic material(s) and that may have tighter bends.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A photonics device is described. The photonics devices include at least one electrode and at least one waveguide.

The waveguide includes electro-optic material(s). The waveguide has a ridge, and a slab. A first portion of the waveguide is proximate to the electrode(s), while a second portion of the waveguide includes a bend. The ridge includes a first side and a second side opposite to the first side. Portions of the slab are proximate to the first side and the second side of the ridge in the first portion of the waveguide. A portion of the slab is omitted in the second portion of the waveguide. In some embodiments, the electro-optic material(s) include one lithium-containing material(s). For example, lithium niobate (LN) and/or lithium tantalate (LT) might be used. The waveguide includes electro-optic material(s), a ridge, and a slab. A first portion of the waveguide is proximate to the electrode(s), while a second portion of the waveguide includes a bend. The ridge includes a first side and a second side opposite to the first side. Portions of the slab are proximate to the first side and the second side of the ridge in the first portion of the waveguide. A portion of the slab is omitted in the second portion of the waveguide. In some embodiments, the electro-optic material(s) include one lithium-containing material(s). For example, lithium niobate (LN) and/or lithium tantalate (LT) might be used.

In some embodiments, the bend has a bending radius not exceeding thirty micrometers. In some embodiments, the bending radius does not exceed ten micrometers. The bend may have an inner region and an outer region. The portion of the slab omitted is proximate to the outer region. In some embodiments, the portion of the slab omitted is proximate to the outer region and the inner region of the bend. The portion of the slab that is omitted may extend through the slab.

In some embodiments, an optical loss through the bend does not exceed 0.5 dB for a ninety degree bend and a bend radius not exceeding twenty micrometers. The optical loss through the bend may not exceed 0.25 dB for the ninety degree bend. The portion of the slab that is omitted is configured such that a corresponding portion of the slab extends not more than one micrometer from the ridge. In some such embodiments, the portion of the slab that is omitted is configured such that the corresponding portion of the slab extends not more than 500 nanometers from the ridge.

A photonics device including electrodes and at least one waveguide is described. The waveguide(s) include at least one thin film lithium-containing electro-optic material. The waveguide(s) include a ridge and a slab. A first portion of the waveguide(s) is between two electrodes of the electrodes. A second portion of the waveguide(s) includes a bend. The slab extends between the ridge and the two electrodes in the first portion of the waveguide. The bend has an inner region and an outer region. A portion of the slab is omitted for the second portion of the waveguide such that the slab extends not more than 500 nanometers from the outer region of the bend.

In some embodiments, the bend has a bending radius not exceeding fifty micrometers. For example, the bending radius may not exceed twenty micrometers. In some embodiments, the optical loss through the bend does not exceed 0.25 dB for a ninety degree bend and a bending radius of not more than forty micrometers.

A method is described. The method includes providing at least one electrode and providing a waveguide including at least one electro-optic material. The waveguide includes a ridge, and a slab. A first portion of the waveguide is proximate to the electrode(s). A second portion of the waveguide includes a bend. The ridge has a first side and a second side opposite to the first side. Portions of the slab are proximate to the first side and the second side of the ridge in the first portion. A portion of the slab is omitted for the second portion of the waveguide. In some embodiments, providing the waveguide further includes forming the ridge from the electro-optic material(s) using a first etch and providing the portion of the slab that is omitted using a second etch. The at least one electro-optic material may include at least one thin film lithium-containing material. In some embodiments, the bend has a bending radius not exceeding twenty micrometers. In some embodiments, the bend has an inner region and an outer region, wherein the portion of the slab omitted is proximate to the outer region. The bend may have an inner region and an outer region. The portion of the slab omitted is proximate to the outer region and the inner region.

Various features of the electro-optic devices are described herein. One or more of these features may be combined in manners not explicitly described herein. The optical devices described herein may be formed using electro-optic materials, such as thin film lithium containing (TFLC) electro-optical materials. For example, thin film lithium niobate (TFLN) and/or thin film lithium tantalate (TFLT) may be used for the components described. Although primarily described in the context of TFLC electro-optic materials, such as TFLN and TFLT, other nonlinear optical materials may be used in the optical devices described herein. For example, other ferroelectric nonlinear (e.g. second order) optical materials may also be desired to be used in, e.g., waveguides, modulators, polarization rotators, and/or mode converters. Such ferroelectric nonlinear optical materials may include but are not limited to potassium niobate (e.g. $KNbO_3$), gallium arsenide (GaAs), potassium titanyl phosphate (KTP), lead zirconate titanate (PZT), and barium titanate ($BaTiO_3$). The techniques described may also be used for other nonlinear ferroelectric optical materials, particularly those which may otherwise be challenging to fabricate. For example, such nonlinear ferroelectric optical materials may have inert chemical etching reactions using conventional etching chemicals such as fluorine, chlorine or bromine compounds.

In some embodiments, the optical material(s) used are nonlinear. As used herein, a nonlinear optical material exhibits the electro-optic effect and has an effect that is at least (e.g. greater than or equal to) 5 picometer/volt. In some embodiments, the nonlinear optical material has an effect that is at least 10 picometer/volt. In some such embodiments nonlinear optical material has an effect of at least 20 picometer/volt. The nonlinear optical material experiences a change in index of refraction in response to an applied electric field. In some embodiments, the nonlinear optical material is ferroelectric. In some embodiments, the electro-optic material effect includes a change in index of refraction in an applied electric field due to the Pockels effect. Thus, in some embodiments, optical materials possessing the electro-optic effect in one or more the ranges described herein are considered nonlinear optical materials regardless of whether the effect is linearly or nonlinearly dependent on the applied electric field. The nonlinear optical material may be a non-centrosymmetric material. Therefore, the nonlinear optical material may be piezoelectric. Such nonlinear optical materials may have inert chemical etching reactions for conventional etching using chemicals such as fluorine, chlorine or bromine compounds. In some embodiments, the nonlinear optical material(s) include one or more of LN, LT, potassium niobate, gallium arsenide, potassium titanyl phosphate, lead zirconate titanate, and barium titanate. In other embodiments, other nonlinear optical materials having analogous optical characteristics may be used.

In some embodiments, waveguides and other structures described herein are low optical loss optical structures. For example, a waveguide may have a total optical loss of not more than 10 dB through the portion of waveguide (e.g. when biased at maximum transmission and as a maximum loss) in proximity to electrodes used in modulating the optical signal. The total optical loss is the optical loss in a waveguide through a single continuous electrode region (e.g. as opposed to multiple devices cascaded together). In some embodiments, the waveguide has a total optical loss of not more than 8 dB. In some embodiments, the total optical loss is not more than 4 dB. In some embodiments, the total optical loss is less than 3 dB. In some embodiments, the total optical loss is less than 2 dB. In some embodiments, the waveguide has an optical loss of not more than 3 dB/cm (e.g. on average). In some embodiments, the nonlinear material(s) in the waveguides has an optical loss of not more than 2.0 dB/cm. In some such embodiments, the waveguide has an optical loss of not more than 1.0 dB/cm. In some embodiments, the waveguide has an optical loss of not more than 0.5 dB/cm. In some embodiments, the low optical losses are associated with a low surface roughness of the side walls of the waveguides.

The waveguides and other optical structures may have improved surface roughness. For example, the short range root mean square surface roughness of a sidewall of the rib may be less than ten nanometers. In some embodiments, this root mean square surface roughness is not more than five nanometers. In some cases, the short range root mean square surface roughness does not exceed two nanometers. In some embodiments, a waveguide includes a rib portion and a slab portion. The height of such a rib portion is selected to provide a confinement of the optical mode such that there is a 10 dB reduction in intensity from the intensity at the center of the rib at ten micrometers from the center of the rib. For example, the height of the rib is on the order of a few hundred nanometers in some cases. However, other heights are possible in other embodiments. Various other optical components may be incorporated into the waveguide to provide the desired functionality. For example, the waveguide may have wider portion(s) for accommodating multiple modes or performing other functions.

The improved surface roughness of waveguides (and other structures described herein) formed of TFLC electro-optic material(s) may be fabricated utilizing photolithography. For example, ultraviolet (UV) and/or deep ultraviolet (DUV) photolithography may be used to pattern masks for the nonlinear optical material. For DUV photolithography, the wavelength of light used is typically less than two hundred and fifty nanometers. To fabricate the waveguide, the thin film nonlinear optical material may undergo a physical etch, for example using dry etching, reactive ion etching (RIE), inductively coupled plasma RIE. In some embodiments, a chemical etch and/or electron beam etch may be used. Waveguide and other structures formed of the electro-optic material(s) may have improved surface roughness.

Figure 1B:
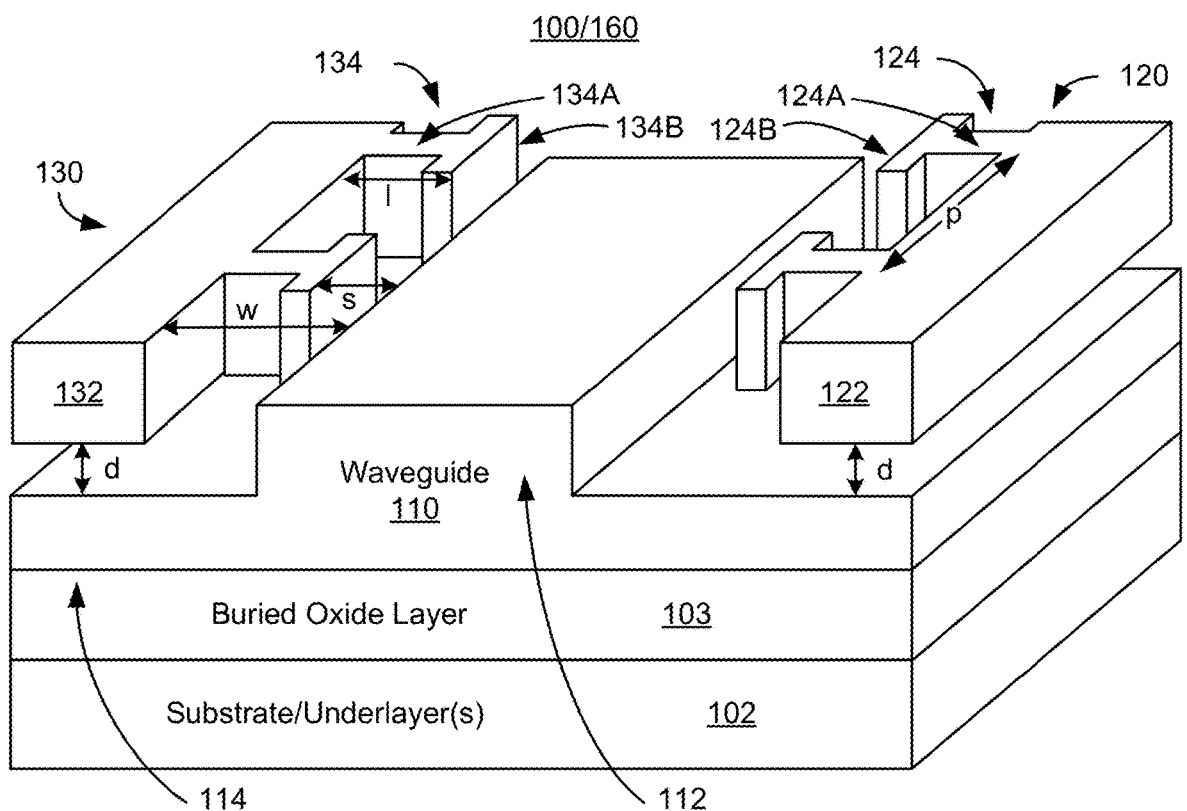
Figure 1C:
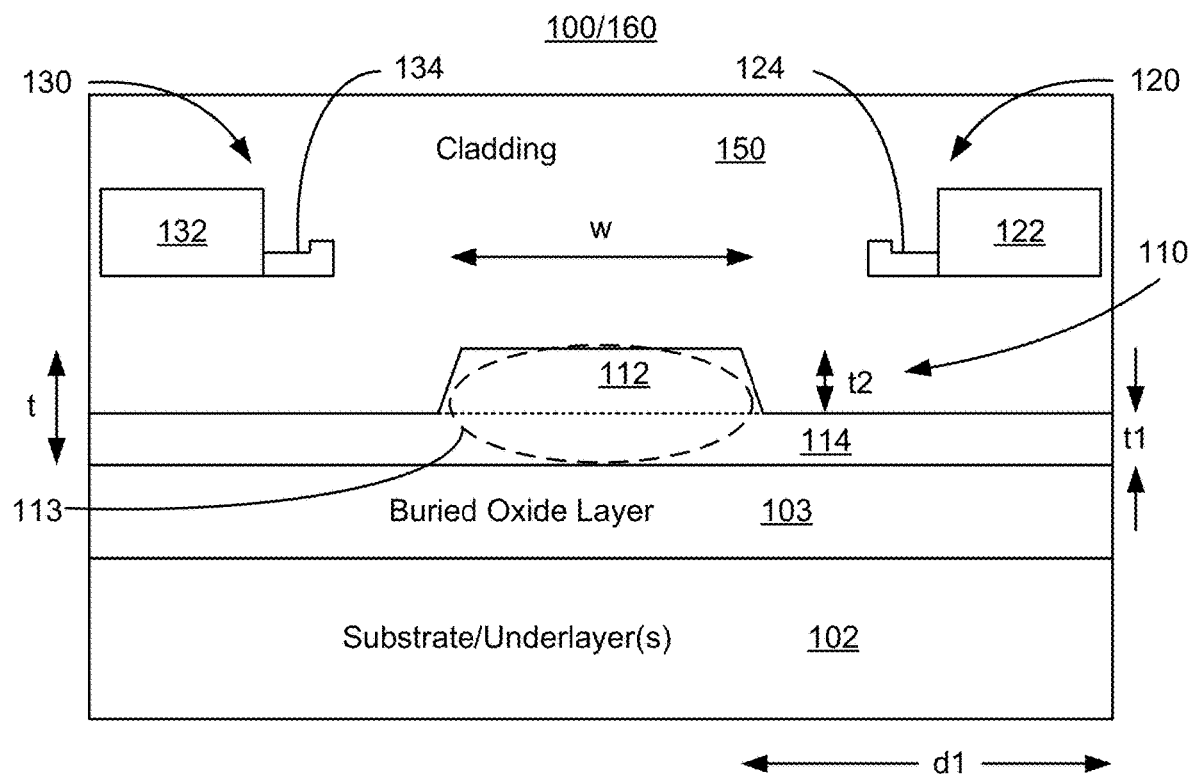
Figure 1D:
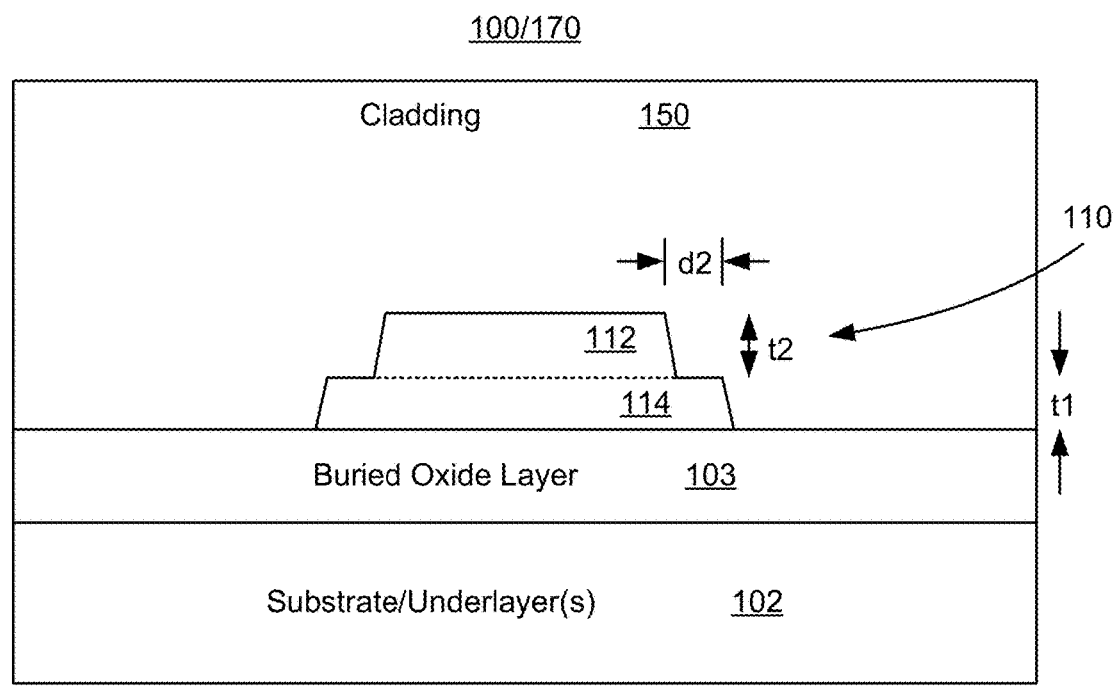

FIGS. 1A-1D depict an embodiment of photonics device 100 using electro-optic material(s) and that may have tighter bends. FIG. 1A is a top view of photonics device 100. FIG. 1B is a perspective view of a portion of photonics device 100. FIG. 1C is a cross-sectional view of photonics device 100 in modulation region 160. FIG. 1D is a cross-sectional view of photonics device 100 in bend region 170. FIGS. 1A-1D are not to scale. Only a portion of photonics device 100 may include other and/or additional structures that are not shown for simplicity.

Photonics device 100 is on a substrate structure that includes substrate 102 and buried oxide (BOX) layer 103. In some embodiments, substrate 102 is a silicon substrate. Substrate 102 may also include other layers. Substrate 102 may be one hundred micrometers or more thick. BOX layer 103 may be a silicon dioxide layer. In some embodiments, BOX layer 103 may be at least three micrometers thick and not more than fifteen micrometers thick. In some embodiments, BOX layer 103 is not more than ten micrometers thick. In some embodiments, BOX layer 103 is at least five micrometers thick. Further, other geometric configurations of substrate 102 and/or BOX layer 103 may be used in some embodiments. Also shown is cladding 150, which may be formed of silicon dioxide.

Photonics device 100 includes waveguide 110 and electrodes 120, 130, and 140. In some embodiments, photonics device 100 may be configured as or include a modulator (or portion thereof). Thus, photonics device 100 may be considered to include a modulation region 160 and a bend region 170. Modulator 100 is shown as configured as a Mach-Zehnder modulator. Other configurations for phase and/or amplitude modulation are possible. For clarity, only the portion of electrodes 120, 130, and 140 proximate to waveguide 110 are shown. Stated differently, electrodes 120, 130, and 140 are shown in modulation region 160.

Waveguide 110 may be considered to include ridge 112 as well as slab 114. Ridge 112 has a height, t, greater than the height, t1, of slab 114. Although shown as trapezoids, ridge 112 and/or slab 114 have other shapes, such as rectangles and/or other analogous shapes. Photonics device 100 includes electro-optic optic material(s), such as TFLC materials (e.g. TFLN and/or TFLT). More specifically, ridge 112 and slab 114 include electro-optic materials, such as TFLC materials. In some embodiments, the waveguide 110 consists of TFLC materials such as TFLN and/or TFLT. In the embodiment shown, ridge 112 and slab 114 are formed of the same material. In some embodiments, ridge 112 and slab 114 may include different materials. Waveguide 110, and more particularly ridge 112, may be used to propagate the optical signal. The optical mode may be well confined to ridge 112 and/or ridge 112 in combination with a portion of nearby slab 114. For example, one embodiment of the optical mode 113 is indicated in the modulation region in FIG. 1C. Slab 114 provides increased electro-optic modulation efficiency. In particular, slab 114 aids in directing the electric field generated by the signal(s) in electrodes 120, 130, and 140 to optical mode 113 in modulation region 160. Thus, a higher modulation for a given electric field may be obtained. As a result, V-pi (and V-pi-L) may be reduced.

Electrodes 120, 130, and 140 may carry electrode signals used to modulate the optical signals (e.g. light) carried by waveguide 110. For example, the electrode signals may provide electro-optic modulation up to frequencies of 100 GHz, 200 GHz, 500 GHZ or higher. In some embodiments, modulator 110 may provide modulation from at or near DC to frequencies of 100 GHz, 200 GHz, 500 GHz, or more. The modulation may also have a wide window, for example an operation bandwidth of at least 10 GHz. In some embodiments, modulator 110 may have an operating bandwidth of at least 30 GHz. In some embodiments, modulator 110 may have an operating bandwidth of at least 50 GHz. In some embodiments, modulator 110 may have an operating bandwidth of at least 100 GHz. In some embodiments, modulator 110 may have an operating bandwidth of at least 130 GHz. In some embodiment, modulator 110 may have a radio frequency (RF) V-pi (singled ended or differential) of at most 8V. In some embodiments, the modulator 110 may have a V-pi of at most 6V. In some embodiments, modulator 110 may have a V-pi at most 4V. In some embodiments, modulator 110 may have a V-pi of at most 3V. In some embodiments, the modulator 110 may have a V-pi of at most 2V or at most 1V.

Electrode signals carried by electrodes 120, 130, and 140 may be configured in a variety of manners. For example, electrode 130 may carry a microwave signal, while electrodes 120 and 140 are ground. Electrode 130 may carry a signal of a first polarity, while electrodes 120 and 140 carry signals of opposite polarity (i.e. in a differential configuration). Other configurations are possible.

FIG. 1B depicts a perspective view of a portion of photonics device 100. For clarity, FIGS. 1A and 1B are not to scale and not all components are shown. System 100 includes an electro-optic device 100 and underlying substrate/underlayers 111. Electro-optic device 100 includes TFLC waveguide 110 and electrodes 120 and 130. Elcetrodes 120 and 130 are configured to carry a traveling wave (e.g. a microwave or RF electrode signal) that modulates the optical signal carried by waveguide 110 via the electro-optic effect.

FIG. 1B depicts an embodiment of a portion of photonics device 100 including TFLC materials. For clarity, top cladding layer(s) 150 are not shown in FIG. 1B. Such cladding layer(s) cover the portions of the device depicted in FIG. 1B. Further, electro-optic device 100 may be configured differently in other embodiments. Electro-optic device 100 includes a substrate and/or underlayers 111, TFLC waveguide 110 that includes ridge 112 and slab portion 114, and electrodes 120 and 130. Electrode 120 includes channel region 122 and extensions 124. Electrode 130 includes channel region 132 and extensions 134. In some embodiments, extensions 124 and 134 may be omitted. Substrate 111 may include an underlying substrate such as Si and a BOX layer (not separately shown) in FIGS. 1A-5B.

Electro-optic waveguide 110 is or includes a TFLC layer that may include or consist of LN and/or LT. In some embodiments, the nonlinear optical material for TFLC waveguide 110 is formed from a thin film layer. For example, the thin film may have a total thickness (e.g. of thin film or slab portion 114 and ridge portion 112) of not more than three multiplied by the optical wavelengths for the optical signal carried in ridge 112 before processing. In some embodiments, the thin film has a total thickness of not more than two multiplied by the optical wavelengths. In some embodiments, the nonlinear optical material has a total thickness of not more than one multiplied by the optical wavelength. In some embodiments, the nonlinear optical material has a total thickness of not more than 0.5 multiplied by the optical wavelengths. For example, the thin film may have a total thickness of not more than three micrometers as-provided. In some embodiment, the thin film has a total thickness of not more than two micrometers. In some embodiment, the thin film has a total thickness of not more than one micrometer as-provided. In some embodiments, the thin film has a total thickness of not more than seven hundred nanometers. In some such embodiments, the thin film has a total thickness of not more than four hundred nanometers. In some embodiments, the thin film has a thickness of at least one hundred nanometers as—provided.

The thin film nonlinear optical material may be fabricated into waveguide 110 utilizing photolithography. For example, ultraviolet (UV) and/or deep ultraviolet (DUV) photolithography may be used to pattern masks for the nonlinear optical material. For DUV photolithography, the wavelength of light used is typically less than two hundred and fifty nanometers. To fabricate the waveguide, the thin film nonlinear optical material may undergo a physical etch, for example using dry etching, reactive ion etching (RIE), inductively coupled plasma RIE. In some embodiments, a chemical etch and/or electron beam etch may be used. Ridge 112 may thus have improved surface roughness. For example, the sidewall(s) of ridge 112 may have reduced surface roughness. For example, the short range root mean square surface roughness of a sidewall of the ridge 112 is less than ten nanometers. In some embodiments, this root mean square surface roughness is not more than five nanometers. In some cases, the short range root mean square surface roughness does not exceed two nanometers. In some embodiments, optical device 100B has an optical loss in signal through the modulator of not more than 1 dB/cm. In some embodiments, the optical loss is not more than 2 dB/cm. In some such embodiments, the optical loss for TFLC waveguide 110 is less than 1.0 dB/cm. For example, this loss may be not more than 0.5 dB/cm in some embodiments. In some embodiments, the height of ridge 112 is selected to provide a confinement of the optical mode such that there is a 10 dB reduction in intensity from the intensity at the center of ridge 112 at ten micrometers from the center of ridge 112. For example, the height of ridge 112, t, is on the order of a few hundred nanometers in some cases. The height of ridge 112 may be not more than three hundred nanometers. In some embodiments, the height of ridge 112 is not more than two hundred nanometers. In some embodiments, the height of ridge 112 is not more than one hundred nanometers. However, other heights are possible in other embodiments. A portion of ridge 112 is proximate to electrodes 120 and 130 along the direction of transmission of the optical signal (e.g. from the input of the optical signal through ridge 112 to the modulated optical signal output). The portion of ridge 112 proximate to electrodes 120 and 130 may have the lengths described above, for example a length greater than two millimeters in some embodiments, and greater than two or more centimeters in some such embodiments. Such lengths are possible at least in part because of the low optical losses per unit length for ridge 112 described herein. Further, the portion of ridge 112 proximate to electrodes 120 and 130 has an optical mode cross-sectional area that is small, for example not extending significantly beyond the edges of ridge 112. In some embodiments, ridge 112 has an optical mode cross-sectional area of less than the square of the wavelength of the optical signal in the nonlinear optical material(s) (e.g. $\lambda^2$). In some embodiments, the optical mode cross-sectional area is less than 3 multiplied by $\lambda^2$, where $\lambda$ is the wavelength of the optical signal in the waveguide.

Electrodes 120 and 130 apply electric fields to ridge 112. Electrode(s) 120 and/or 130 may be fabricated using deposition techniques, such as electroplating, and photolithography to shape the electrode(s) 120 and/or 130. The resulting electrode(s) 120 and/or 130 may have a lower frequency dependent electrode loss, in the ranges described herein. Electrode 120 includes a channel region 122 and extensions 124 (of which only one is labeled in FIG. 1B). Electrode 130 includes a channel region 132 and extensions 134 (of which only one is labeled in FIG. 1B). In some embodiments, extensions 124 or 134 may be omitted from electrode 120 or electrode 130, respectively. Extensions 124 and 134 are closer to ridge 112 than channel region 122 and 132, respectively, are. For example, the distance s from extensions 124 and 134 to waveguide ridge 112 is less than the distance w from channels 122 and 132 to waveguide ridge 112. In the embodiment shown in FIG. 1B, extensions 124 and 134 are at substantially the same level as channel regions 122 and 132, respectively. In some embodiments, the extensions may protrude above and/or below the channel regions in addition to or in lieu of being at the same level. Further, if electrodes 120 and 130 are above ridge 112, extensions 124 and 134 may extend over the top of ridge 112. Stated differently, extensions 124 and 134 may be closer than the width of ridge 112.

Extensions 124 and 134 are in proximity to ridge 112. For example, extensions 124 and 134 are a vertical distance, d from TFLC waveguide 110. The vertical distance to TFLC waveguide 110 may depend upon the cladding 150 (not shown in FIG. 1B) used. The distance d is highly customizable in some cases. For example, d may range from zero (or less if electrodes 120 and 130 contact or are embedded in slab portion 114) to greater than the height of ridge 112. However, d is generally still desired to be sufficiently small that electrodes 120 and 130 can apply the desired electric field to ridge 112. Extensions 124 and 134 are also a distance, s, from ridge 112. Extensions 124 and 134 are desired to be sufficiently close to TFLC waveguide 110 (e.g. close to ridge 112) that the desired electric field and index of refraction change can be achieved. However, extensions 124 and 134 are desired to be sufficiently far from TFLC waveguide 110 (e.g. from ridge 112) that their presence does not result in undue optical losses. Although the distance s is generally agnostic to specific geometry or thickness of TFLC waveguide 110, s may be selected to allow for both transverse electric and transverse optical modes that are confined differently in TFLC waveguide 110. However, the optical field intensity at extensions 124 and 134 (and more particularly at sections 124B and 134B) is desired to be reduced to limit optical losses due to absorption of the optical field by the conductors in extensions 124 and 134. Thus, s and/or d are sufficiently large that the total optical loss for ridge 112, including losses due to absorption at extensions 124 and 134, is not more than 10 dB or less in some embodiments, 1 dB or less in some embodiments, and/or 4 dB or less in some embodiments. In some embodiments, s is selected so that optical field intensity at extensions 124 and 134 is less than −10 dB of the maximum optical field intensity in ridge 112. In some embodiments, s is chosen such that the optical field intensity at extensions 124 and 134 is less than −40 dB of its maximum value in the waveguide. For example, extensions 124 and/or 134 may be at least two micrometers and not more than 2.5 micrometers from ridge 112 in some embodiments. In some embodiments, extensions 124 and/or 134 may extend over ridge 112 if d is greater than the height of the ridge for ridge 112.

In the embodiment shown, extensions 124 have a connecting portion 124A and a retrograde portion 124B. Retrograde portion 124B is so named because a part of retrograde portion may be antiparallel to the direction of signal transmission through electrode 120. Similarly, extensions 134 have a connecting portion 1234A and a retrograde portion 134B. Thus, extensions 124 and 134 have a "T"-shape. In some embodiments, other shapes are possible. For example, extensions 124 and/or 134 may have an "L"-shape, may omit the retrograde portion, may be rectangular, trapezoidal, parallelogram-shaped, may partially or fully wrap around a portion of ridge 112, and/or have another shape. Similarly, channel regions 122 and/or 132, which are shown as having a rectangular cross-section, may have another shape. Further, extensions 124 and/or 134 may be different sizes. Although all extensions 124 and 134 are shown as the same distance from ridge 112, some of extensions 124 and/or some of extensions 134 may be different distances from ridge 112. Channel regions 122 and/or 132 may also have a varying size. In some embodiments, extensions 124 and 134, respectively, are desired to have a length, l (e.g. l=w−s), that corresponds to a frequency less than the Bragg frequency of the signal for electrodes 120 and 130, respectively. Thus, the length of extensions 124 and 134 may be desired to be not more than the microwave wavelength of the electrode signal divided by π at the highest frequency of operation for electrodes 120 and 130. In some embodiments, the length of extensions 124 and 134 is desired to be less than the microwave wavelength divided by twelve. For example, if the maximum operation frequency is 300 GHz, which corresponds to a microwave wavelength of 440 micrometers in the substrate, extensions 124 and 134 are desired to be smaller than approximately 37 micrometers. Individual extensions 124 and/or 134 may be irregularly spaced or may be periodic. Periodic extensions have a constant pitch. In some embodiments, the pitch, p, is desired to be a distance corresponding to a frequency that is less than the Bragg frequency, as discussed above with respect to the length of extensions 124 and 134. Thus, the pitch for extensions 124 and 134 may be desired to be not more than the microwave wavelength of the electrode signal divided by π at the highest frequency of operation for electrodes 120 and 130. In some embodiments, the pitch is desired to be less than the microwave wavelength divided by twelve. In some embodiments, the pitch is desired to be less than the microwave wavelength divided by seventy two, allowing for a low ripple in group velocity.

Extensions 124 and 134 are closer to ridge 112 than channels 122 and 132, respectively, are (e.g. s<w). In some embodiments, a dielectric cladding 150 (not explicitly shown in FIG. 1B) resides between electrodes 120 and 130 and TFLC waveguide 110. As discussed above, extensions 124 and 134 are desired to have a length (w−s) that corresponds to a frequency less than the Bragg frequency of the signal for electrodes 120 and 130, respectively. Extensions 124 and 134 are also desired to be spaced apart from ridge 112 as indicated above (e.g. such that the absorption loss in ridge 112 can be maintained at the desired level, such as 10 dB or less). The length of the extensions 124 and 134 and desired separation from ridge 112 (e.g. s) are considered in determining w. Although described in the context of a horizontal distance, the distance between electrode structures and the waveguide also applies for vertical configurations. Other distances between ridge 112 and channel regions 122 and/or 132 are possible.

Extensions 124 and 134 protrude from channel regions 122 and 132, respectively, and reside between channel regions 122 and 132, respectively, and waveguide 100. As a result, extensions 124 and 134 are sufficiently close to waveguide 100 to provide an enhanced electric field at waveguide 100. Consequently, the change in index of refraction induced by the electric field is increased. In contrast, channel regions 122 and 132 are spaced further from waveguide 100 than the extensions 124 and 134. Thus, channel region 122 is less affected by the electric field generated by electrode 130/extensions 134. Electrical charges have a reduced tendency to cluster at the edge of channel region 122 closest to electrode 130. Consequently, current is more readily driven through central portions channel region 122 and the electrode losses in channel region 122 (and electrode 120) may be reduced. Because microwave signal losses through electrodes 120 and 130 may be reduced, a smaller driving voltage may be utilized for electrode(s) 120 and/or 130 and less power may be consumed by optical device 100. In addition, the ability to match the impedance of electrode 120 with an input voltage device (not shown) may be improved. Such an impedance matching may further reduce electrode signal losses for optical device 100. Moreover, extensions 124 and 134 may affect the speed of the electrode signal through electrodes 120 and 130. Thus, extensions 124 and 134 may be configured to adjust the velocity of the electrode signal to match the velocity of the optical signal in waveguide 100. Consequently, performance of optical device 100 may be improved.

FIGS. 1C and 1D depict cross-sectional views of photonic device 100 in modulation region 160 and bend region 170, respectively. Referring to FIGS. 1A-1D, slab 114 improves the modulation efficiency by directing electric field toward ridge 112 in modulation region 160. Thus, slab 112 may extend at least between electrodes 120 and 130 and 130 and 140 in modulation region 160. In modulation region 160, slab may also extend further as shown in FIGS. 1A and 1C. However, without more, slab 114 may result in a larger photonic device. The bending radius, r, of bends in a conventional photonic device may be large to reduce losses due to optical radiation in the substrate and/or portions of the photonic device.

In contrast to a conventional device, portions of slab 114 have been removed (or omitted) in bend region 170. For example, slab 114 may be thinned, have portions removed, or otherwise configured for improved confinement of the optical mode in bend region 170. In some embodiments, waveguide 110 may transition to a thinner slab 114 (thickness t1) in bend region 170 from a thicker ridge 112 (thickness t) in modulation region 160. In the embodiment shown, this transition occurs through a tapering of slab 114. Thus, the optical mode may be better confined in bend region 170.

This may be readily seen in a comparison of modulation region 160 and bend region 170 in FIGS. 1A, 1C, and 1D. Slab 114 extends at least to and generally past electrodes 120, 130, and 140 in modulation region 160. In some embodiments, the separation between electrodes 120, 130, and 140 and the corresponding portion of ridge 112 is not more than seven micrometers, not more than five micrometers, or not more than three micrometers. In such embodiments, slab 114 may extend at least to the electrodes (e.g. d1≥3 micrometers, d1≥5 micrometers, or d1≥7 micrometers) in modulation region 160. In some such embodiments, slab 114 is continuous in modulation region 160. In some embodiments, slab 114 may have some topography (e.g. trenches) in modulation region 160. However, in bend region 170, portions of slab 114 have been removed. Thus, in some embodiments, d2<d1. For example, slab 114 may extend not more than 500 nanometers (d2≤500 nanometers) from ridge 112 in bend region 170. In some embodiments, the slab 114 extends at least 50 nm from ridge 112 in bend region 170. In some embodiments, the slab 114 extends at least 100 nanometers from ridge 112 in bend region 170. In some embodiments, the slab 114 extends at least one micrometer from ridge 112 in bend region 170. In some embodiments, slab 114 extends not more than 100 nm or not more than 500 nm from the ridge 112 in bend region 170. In some embodiments, the slab 114 extends at most one micrometer from ridge 112 in bend region 170. In some embodiments, the outside slab extends at most 2 micrometers wider from the ridge waveguide. In some embodiments, the slab 114 extends at most two micrometers from ridge 112 in bend region 170. In some embodiments, the slab 114 extends at most five micrometers from ridge 112 in bend region 170.

Because of the removal of a portion of slab 114 in bend region 170, the optical mode is better confined to the remaining portion of slab 114. Optical losses due to slab 114 in bend region 170 may be reduced. As a result, the radius of curvature of the bends in waveguide 110 may be reduced without unduly increasing optical losses. For example, the bend has a bending radius of less than 80 micrometers. In some embodiments, the bending radius is not more than 50 micrometers. In some embodiments, the bending radius is not more than 30 micrometers. In some embodiments, the bending radius is not more than 20 micrometers. In some embodiments, the bending radius is not more than 10 micrometers. The bending radius may be at least 3 micrometers or at least 5 micrometers.

The optical loss through the bend is not more than 1 dB for the radii above and a ninety degree bend. In some embodiments, optical loss through the ninety degree bend is not more than 0.5 dB for the radii above. For example, a bending radius of not more than 30 micrometers, not more than 20 micrometers, or not more than 15 micrometers may have an optical loss through a ninety degree bend of not more than 0.5 dB. The optical loss may be not more than 0.25 dB through the ninety degree bend for at least some of the radii above (e.g. not more than 40 micrometer bending radius). In some embodiments, the optical loss is not more than 0.1 dB through the ninety degree bend for at least some of the radii above. The optical loss may be not more than 0.05 dB and at least 0.01 dB through the ninety degree bend for at least some of the radii above.

In some embodiments, this low loss may be achieved by partially or completely removing the slab 114 of waveguide 110 in bending region 170. In the embodiment shown, most of slab 114 has been removed in bending region 170. In some embodiments, slab 114 may be thinned, may be completely removed (essentially leaving a channel waveguide), may be removed on the outside region of the bend, may have channels provided therein, or may have an analogous structure. Some of such structures are shown herein. Because of the partial or complete removal of slab 114 in bending region 170, the smaller bending radius and lower losses may be achieved. Further, because slab 113 remains proximate to electrode(s) 120, 130, and 140 in modulation region 160, the efficiency of optical modulator 100 may be maintained or improved. The bend(s) of bending region 170 may be semicircular, or following various types of continues curvature such as Euler curves, or a combination of semicircular and Euler curves.

Photonics device 100 may have improved performance. Photonics device 100 may be a compact modulator that includes tighter bends in one or more bending regions analogous to bending region 170. These bends may be used to introduce an optical delay that can be tuned to velocity match the optical and electrode signals. In TFLC electro-optic materials, the optical signal generally travels more rapidly through waveguide 110 than the electrode (e.g. microwave) signal travels through electrodes 120, 130, and/or 140. A longer path length for waveguide 110 in bending region 170 may be provided (e.g. via more bends, longer/more straight portions of the waveguide, and/or other shapes of bends such as s-bends) for a smaller overall device size. As a result, velocity matching may be improved and modulation of the optical signal made more efficient. This may be achieved at lower optical losses and smaller photonics devices. In addition, for larger thicknesses of waveguide 110, hybridization of TE and TE modes may occur for some wavelengths. Etching slab 114 to reduce the thickness and, in some embodiments, remove portions of the slab 114 may reduce hybridization. For example, hybridization due to the y-splitter of waveguide 110 may be reduced.

Further, use of TFLC electro-optic materials for waveguide 110 may reduce losses throughout waveguide 110 (e.g. in modulation region 160). For example, the low surface roughness of the sidewalls of ridge 112 may reduce optical losses. Fabrication of photonics device 100 may be simplified, made more repeatable, and made more scalable through the use of photolithography. The use of extensions 124 and 134 may improve performance. Use of electrodes 120 and 130 having extensions 124 and 134, respectively, may reduce microwave losses, allow for a large electric field at ridge 112 and improve the propagation of the microwave signal through electrodes 120, 130, and/or 140. Thus, the use of TFLC photonics components may achieve improved performance, lower cost, higher yield, and/or improved scalability while reducing device size, facilitating scalability, and mitigating optical losses. Thus, performance of photonics device 100 may be improved.

Figure 2A:
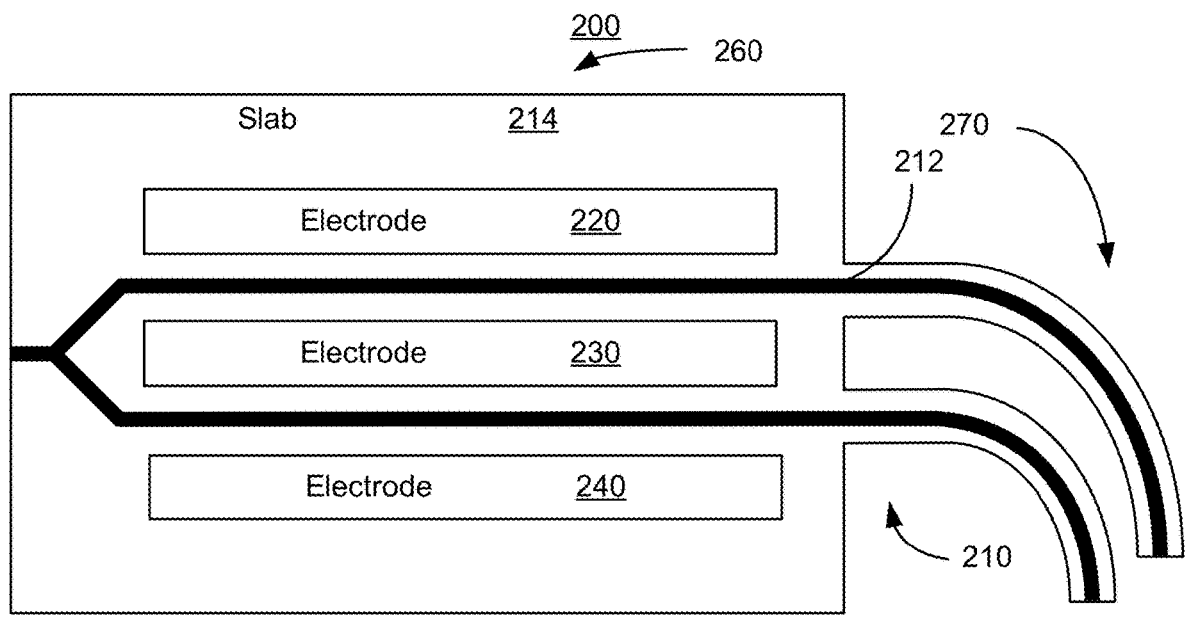
FIGS. 2A-2B depict an embodiment of a photonics device using electro-optic material(s) and that may have tighter bends.
Figure 2B:
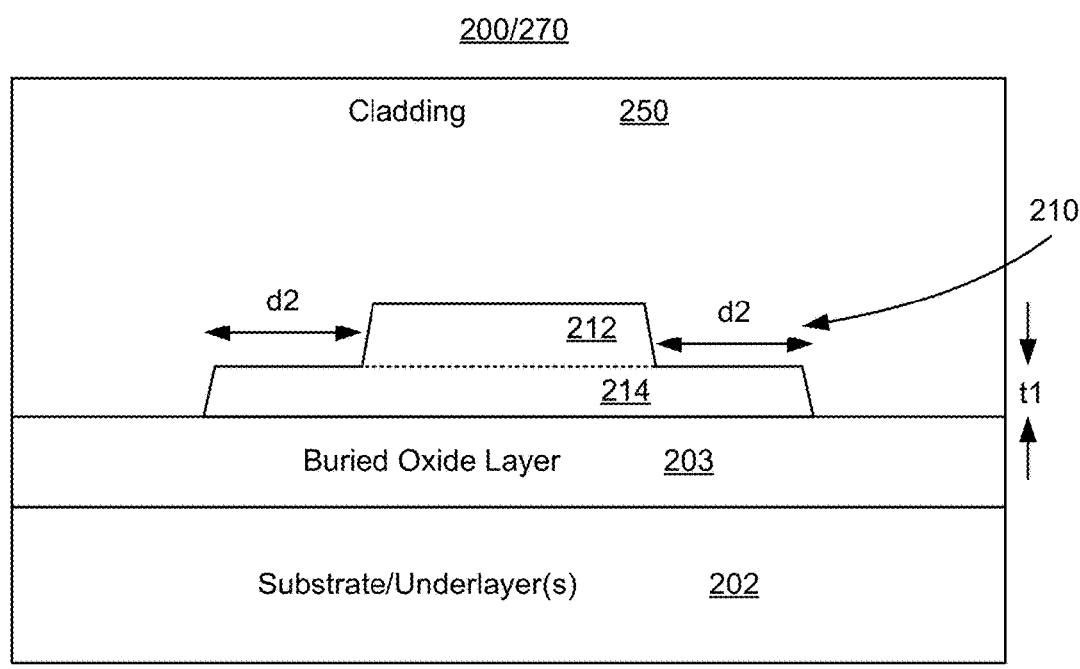

FIGS. 2A-2B depict an embodiment of photonics device 200 using electro-optic material(s) and that may have tighter bends. FIG. 2A depicts a plan view of photonics device 200, while FIG. 2B depicts a cross-sectional view of photonics device 200 in bend region 270. Photonics device 200 includes modulation region 260 and bend region 270 analogous to modulation region 160 and bend region 170. Photonics device 200 also includes waveguide 210 having ridge 212 and slab 214 in combination with electrodes 220, 230, and 240 that are analogous to waveguide 110, ridge 112, slab 114, and electrodes 120, 130, and 140.

Portions of slab 214 have been removed (or are otherwise omitted) in bend region 270. In the embodiment shown, slab 214 is not gradually tapered from modulation region 260 to bend region 270. Instead, the transition between widths of slab 214 occurs more abruptly. In the embodiment shown, slab 214 extends a distance d2 from the edges of ridge 212 in bend region. However, d2 may still be in the range discussed with respect to photonics device 100. For example, d2<d1 (e.g. slab 214 may extend less far in bend region 270 than in modulation region 260).

Photonics device 200 shares the benefits of photonics device 100. Removal of a portion of slab 214 in bend region 270 may improve confinement of the optical mode in bend region 270 and reduce optical losses. Thus, tighter bends may be used. Bends may be used to introduce an optical delay that can be tuned to better match the velocities of the optical and electrode signals. Modulation of the optical signal may be made more efficient at lower optical losses and smaller photonics devices. In addition, unintended hybridization of modes may be mitigated. Further, the use of TFLC electro-optic materials for waveguide 210 may reduce losses throughout waveguide 210. Fabrication of photonics device 200 may be simplified, made more repeatable, and made more scalable through the use of photolithography. Electrodes 220, 230, and/or 240 may include extensions that may reduce microwave losses, allow for a large electric field at ridge 212 and improve the propagation of the microwave signal through electrodes 220, 230, and/or 240. Thus, the use of TFLC photonics components may achieve improved performance, lower cost, higher yield, and/or improved scalability while reducing device size, facilitating scalability, and mitigating optical losses.

Figure 3A:
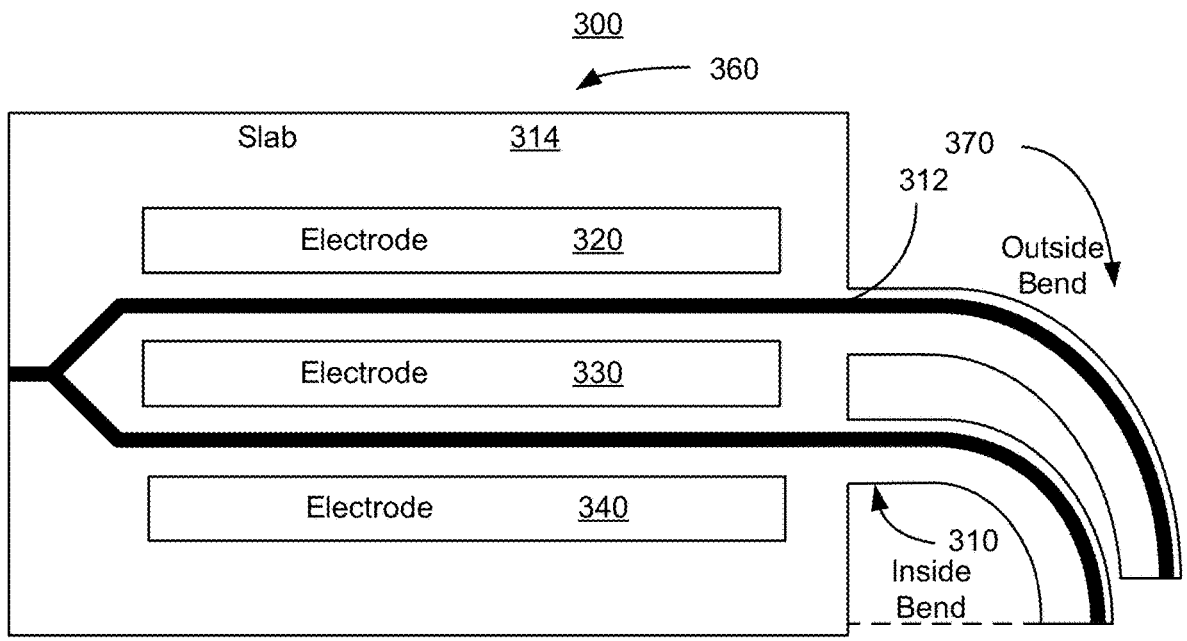
FIGS. 3A-3B depict an embodiment of a photonics device using electro-optic material(s) and that may have tighter bends.
Figure 3B:
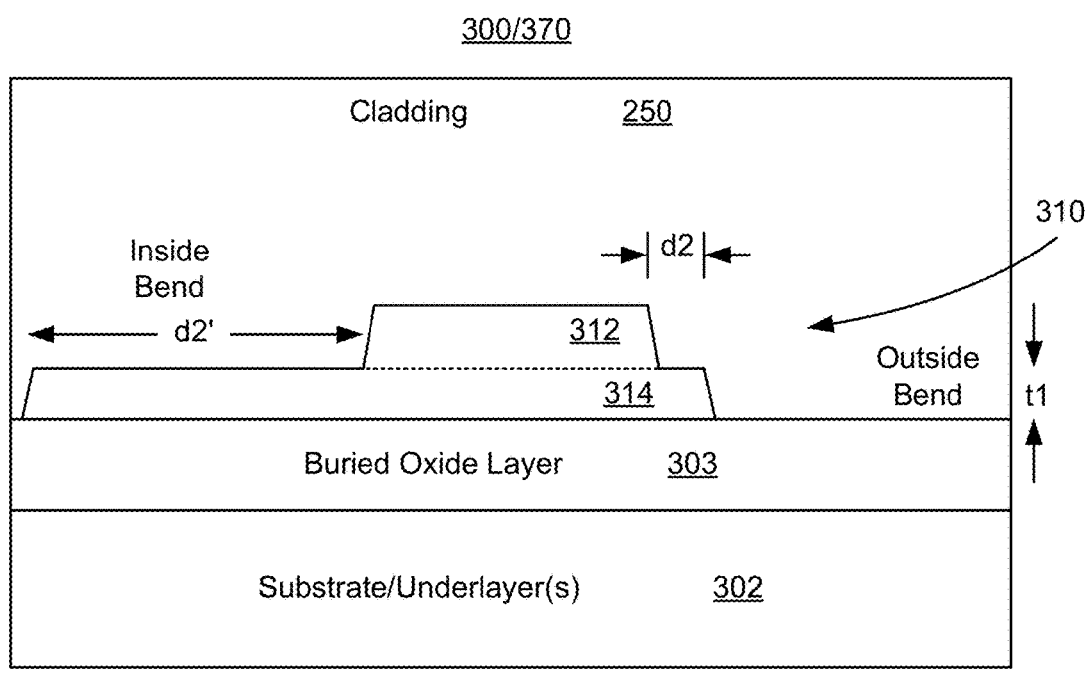

FIGS. 3A-3B depict an embodiment of photonics device 3 using electro-optic material(s) and that may have tighter bends. FIG. 3A depicts a plan view of photonics device 300, while FIG. 3B depicts a cross-sectional view of photonics device 300 in bend region 370. Photonics device 300 includes modulation region 360 and bend region 370 analogous to modulation region 160 and bend region 170. Photonics device 300 also includes waveguide 310 having ridge 312 and slab 314 in combination with electrodes 320, 330, and 340 that are analogous to waveguide 110, ridge 112, slab 114, and electrodes 120, 130, and 140.

In the embodiment shown, slab 314 is not gradually tapered from modulation region 360 to bend region 370. Instead, the transition between widths of slab 314 occurs more abruptly. In addition, portions of slab 314 have been removed (or are otherwise omitted) in bend region 370. In the embodiment shown, slab 314 extends a distance d2 from the outside edge of ridge 312 in bend region. However, d2 may still be in the range discussed with respect to photonics device 100. The portion of slab 314 at the inner edge of the bend extends further from ridge 312 (e.g. distance d2'>d2). In some embodiments, d2' may extend significantly further than d2. For example, in the lower arm of waveguide 310 in bend region 370, slab 314 in the inner portion of the bend of waveguide 370 may not be removed (as indicated by a dashed line). Thus, the portion of slab 314 on the inner side of the bend may be thinned, partially removed, or left unchanged. This asymmetry in slab 314 may facilitate fabrication of photonics device 300 because less TFLC may be removed in bend region 370. Because portions slab 314 are still removed from the outside of the bends, the optical mode in waveguide 310 is still better confined in bend region 370. Consequently, bends may still be made tighter (i.e. have reduced radii of curvature) while mitigating losses.

Photonics device 300 shares the benefits of photonics device(s) 100 and/or 200. Removal of a portion of slab 314 in bend region 370 may improve confinement of the optical mode in bend region 370 and reduce optical losses. Thus, tighter bends may be used. Bends may be used to introduce an optical delay that can be tuned to better match the velocities of the optical and electrode signals. Modulation of the optical signal may be more efficient at lower optical losses and smaller photonics devices. In addition, unintended hybridization of modes may be mitigated. Further, the use of TFLC electro-optic materials for waveguide 310 may reduce losses throughout waveguide 310. Fabrication of photonics device 300 may be simplified, made more repeatable, and made more scalable through the use of photolithography. Electrodes 320, 330, and/or 340 may include extensions that may reduce microwave losses, allow for a large electric field at ridge 312 and improve the propagation of the microwave signal through electrodes 320, 330, and/or 340. Thus, the use of TFLC photonics components may achieve improved performance, lower cost, higher yield, and/or improved scalability while reducing device size, facilitating scalability, and mitigating optical losses.

Figure 4:
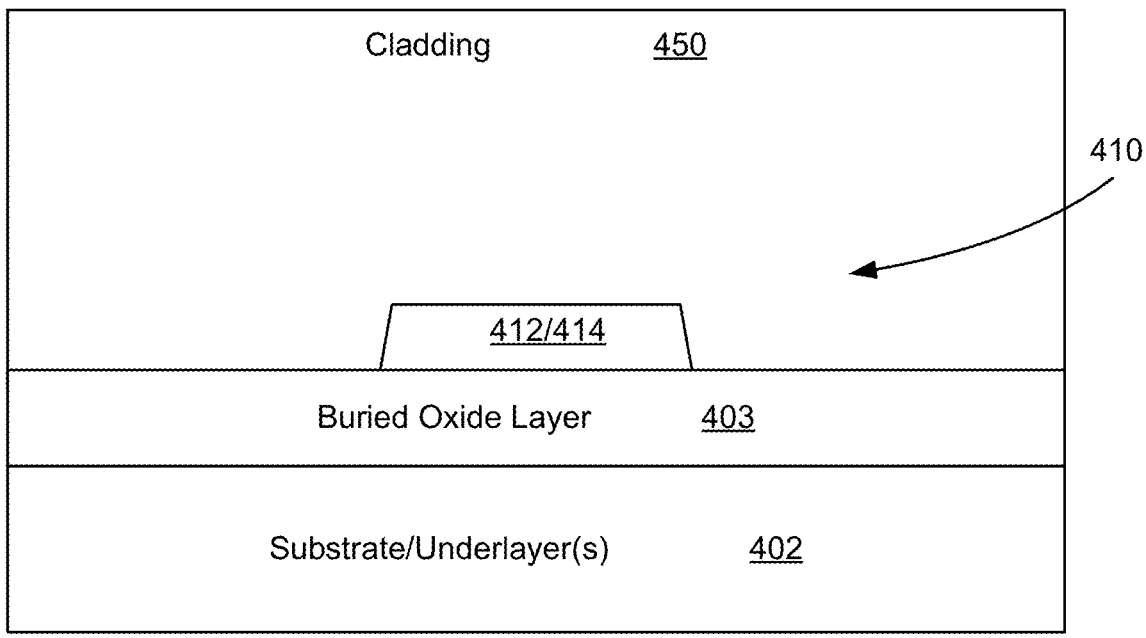
FIG. 4 depicts an embodiment of a photonics device using electro-optic material(s) and that may have tighter bends.

FIG. 4 depicts an embodiment of photonics device 400 using electro-optic material(s) and that may have tighter bends. FIG. 4 depicts a cross-sectional view of photonics device 400 in bend region 470. Photonics device 400 may also include a modulation region and other components analogous to those of photonics devices 100, 200, and/or 300. Photonics device 400 includes waveguide 410 having ridge 412 and slab 414 in combination with electrodes (not shown) that are analogous to waveguide 110, 210, and/or 310, ridge 112, 212, and/or 312, slab 114, 214, and/or 314, and electrodes 120, 130, 140, 220, 230, 240, 320, 330, and/or 340.

In the embodiment shown, not only have portions of slab 414 have been removed (or are otherwise omitted) in bend region 470, but waveguide 410 has also been thinned. This may further improve the confinement of the optical mode in the bends. Consequently, bends may still be made tighter (i.e. have reduced radii of curvature) while mitigating losses.

Photonics device 400 shares the benefits of photonics device(s) 100, 200, and/or 300. Removal of a portion of slab 414 in bend region 470 may improve confinement of the optical mode in bend region 470 and reduce optical losses. Thus, tighter bends may be used. Bends may be used to introduce an optical delay that can be tuned to better match the velocities of the optical and electrode signals. Modulation of the optical signal may be more efficient for lower optical losses and smaller photonics devices. In addition, unintended hybridization of modes may be mitigated. Further, the use of TFLC electro-optic materials for waveguide 410 may reduce losses throughout waveguide 410. Fabrication of photonics device 400 may be simplified, made more repeatable, and made more scalable through the use of photolithography. Electrodes may include extensions that may reduce microwave losses, allow for a large electric field at ridge 412 and improve the propagation of the microwave signal through the electrodes. Thus, the use of TFLC photonics components may achieve improved performance, lower cost, higher yield, and/or improved scalability while reducing device size, facilitating scalability, and mitigating optical losses.

Figure 5:
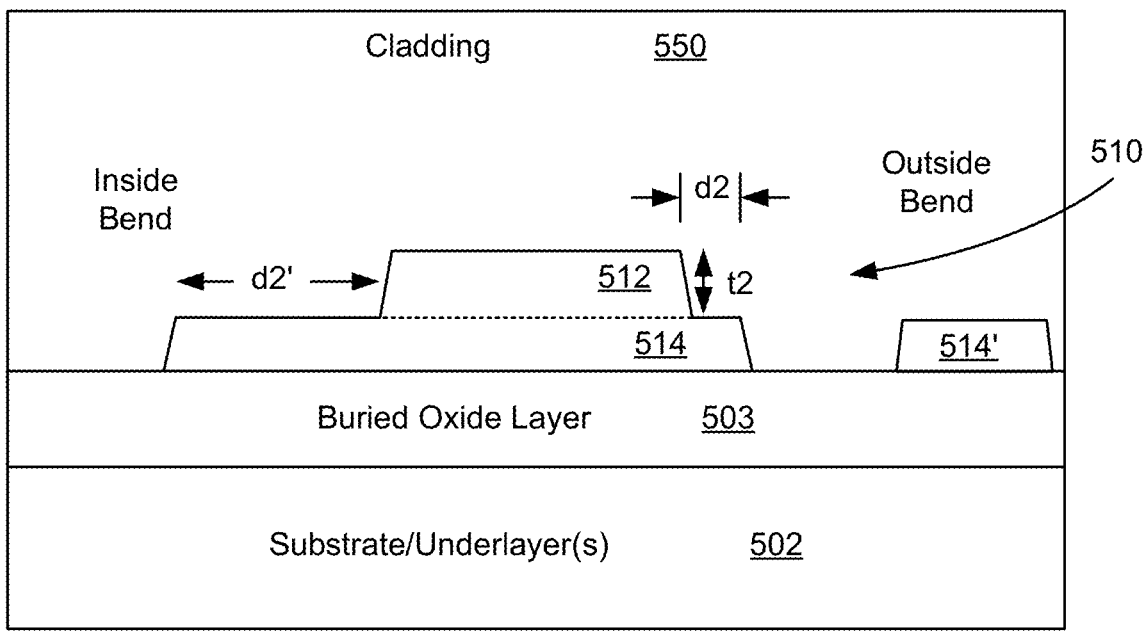
FIG. 5 depicts an embodiment of a photonics device using electro-optic material(s) and that may have tighter bends.

FIG. 5 depicts an embodiment of photonics device 500 using electro-optic material(s) and that may have tighter bends. FIG. 5 depicts a cross-sectional view of photonics device 500 in bend region 570. Photonics device 500 may also include a modulation region and other components analogous to those of photonics devices 100, 200, 300, and/or 400. Photonics device 500 includes waveguide 510 having ridge 512 and slab 514 in combination with electrodes (not shown) that are analogous to waveguide 110, 210, 310, and/or 410, ridge 112, 212, 312, and/or 412, slab 114, 214, 314, and/or 414, and electrodes 120, 130, 140, 220, 230, 240, 320, 330, and/or 340.

Portions of slab 514 have been removed (or are otherwise omitted) in bend region 570. In the embodiment shown, slab 514 extends a distance d2 from the outside edge of ridge 512 in bend region. However, d2 may still be in the range discussed with respect to photonics device 100. The portion of slab 514 at the inner edge of the bend extends further from ridge 512 (e.g. distance d2'>d2). In some embodiments, d2' may extend significantly further than d2. Thus, photonics device 500 is analogous to photonics device 300. However, an additional portion 514' of slab 514 remains. This portions 514' may not adversely affect confinement of the optical mode in bend region 570 because of the separation between remainder of slab 514 and portion 514'. This asymmetry in slab 514 may facilitate fabrication of photonics device 500 because less TFLC may be removed in bend region 570. Because portions slab 514 are still removed from the outside of the bends, the optical mode in waveguide 510 is still better confined in bend region 570. Consequently, bends may still be made tighter (i.e. have reduced radii of curvature) while mitigating losses.

Photonics device 500 shares the benefits of photonics device(s) 100, 200, 300, and/or 400. Removal of a portion of slab 514 in bend region 570 may improve confinement of the optical mode in bend region 570 and reduce optical losses. Thus, tighter bends may be used. Bends may be used to better match the velocities of the optical and electrode signals, improve modulation efficiency, mitigate optical losses, provide smaller photonics devices, and facilitate integration. Fabrication of photonics device 500 may be simplified, made more repeatable, and made more scalable through the use of photolithography. Electrodes (not shown) may include extensions that may reduce microwave losses, allow for a large electric field at ridge 512 and improve the propagation of the microwave signal through the electrodes. Thus, the use of TFLC photonics components may achieve improved performance, lower cost, higher yield, and/or improved scalability while reducing device size, facilitating scalability, and mitigating optical losses.

Figure 6:
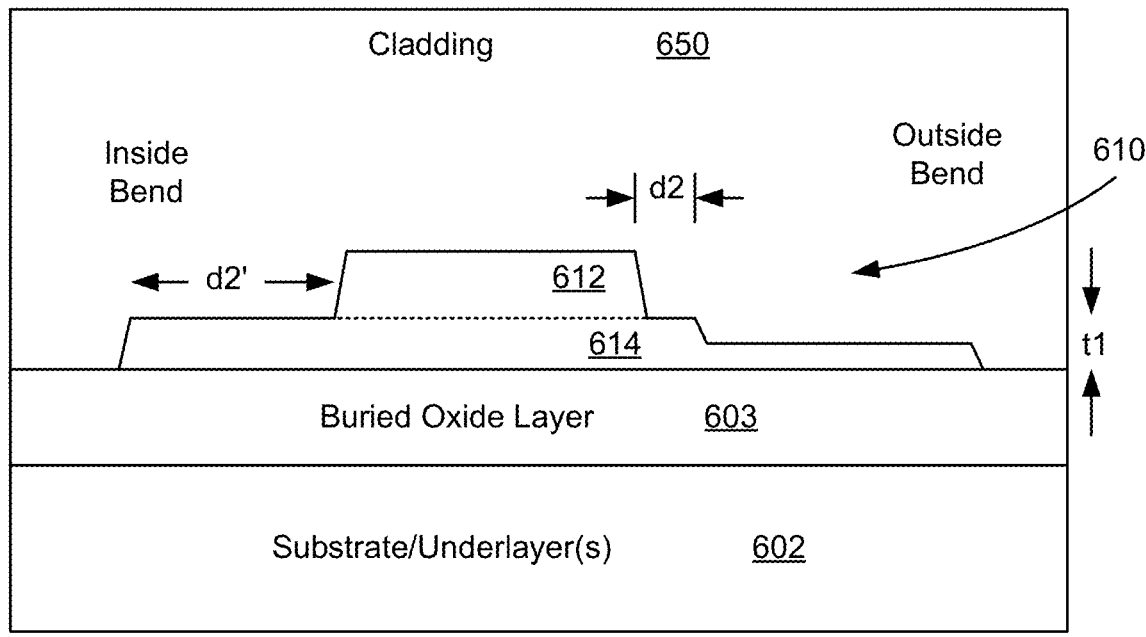
FIG. 6 depicts an embodiment of a photonics device using electro-optic material(s) and that may have tighter bends.

FIG. 6 depicts an embodiment of photonics device 600 using electro-optic material(s) and that may have tighter bends. FIG. 6 depicts a cross-sectional view of photonics device 600 in bend region 670. Photonics device 600 may also include a modulation region and other components analogous to those of photonics devices 100, 200, 300, 400, and/or 500. Photonics device 600 includes waveguide 610 having ridge 612 and slab 614 in combination with electrodes (not shown) that are analogous to waveguide 110, 210, 310, 410, and/or 510, ridge 112, 212, 312, 412, and/or 512, slab 114, 214, 314, 414, and/or 514, and electrodes 120, 130, 140, 220, 230, 240, 320, 330, and/or 340.

In the embodiment shown, portions of slab 614 have been removed (or are otherwise omitted) in bend region 670. Slab 614 extends a distance d2 from the outside edge of ridge 612 in bend region. However, d2 may still be in the range discussed with respect to photonics device 100. The portion of slab 614 at the inner edge of the bend extends further from ridge 612 (e.g. distance d2'>d2). In some embodiments, d2' may extend significantly further than d2. Thus, photonics device 600 is analogous to photonics devices 300 and 500. However, a thinned portion of slab 614 extends past d2 in the outside bend. This portion of slab 614 may not adversely affect confinement of the optical mode in bend region 670 because of the significantly reduced thickness in this region. This asymmetry in slab 614 may facilitate fabrication of photonics device 600 because less TFLC may be removed in bend region 670. Consequently, bends may still be made tighter (i.e. have reduced radii of curvature) while mitigating losses.

Photonics device 600 shares the benefits of photonics device(s) 100, 200, 300, 400, and/or 500. Removal of a portion of slab 614 in bend region 670 may improve confinement of the optical mode in bend region 670 and reduce optical losses. Thus, tighter bends may be used. Bends may be used to better match the velocities of the optical and electrode signals, improve modulation efficiency, mitigate optical losses, provide smaller photonics devices, and facilitate integration. Fabrication of photonics device 600 may be simplified, made more repeatable, and made more scalable through the use of photolithography. Electrodes (not shown) may include extensions that may reduce microwave losses, allow for a large electric field at ridge 612 and improve the propagation of the microwave signal through the electrodes. Thus, the use of TFLC photonics components may achieve improved performance, lower cost, higher yield, and/or improved scalability while reducing device size, facilitating scalability, and mitigating optical losses.

Figure 7:
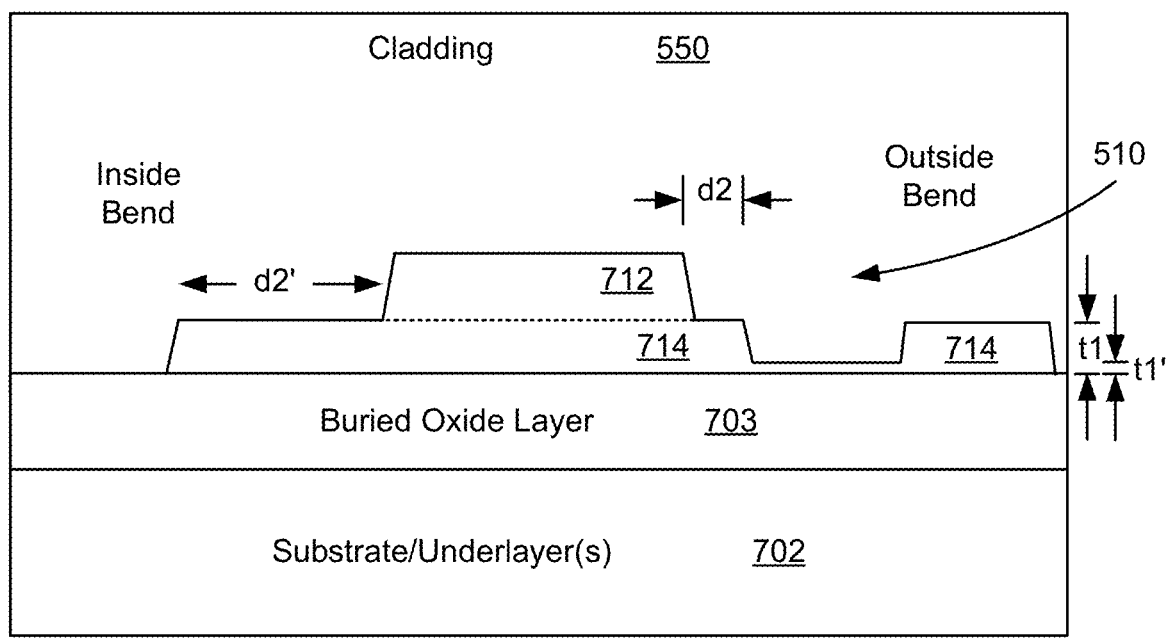
FIG. 7 depicts an embodiment of a photonics device using electro-optic material(s) and that may have tighter bends.

FIG. 7 depicts an embodiment of photonics device 700 using electro-optic material(s) and that may have tighter bends. FIG. 7 depicts a cross-sectional view of photonics device 700 in bend region 770. Photonics device 700 may also include a modulation region and other components analogous to those of photonics devices 100, 200, 300, 400, 500, and/or 600. Photonics device 700 includes waveguide 710 having ridge 712 and slab 714 in combination with electrodes (not shown) that are analogous to waveguide 110, 210, 310, 410, 510, and/or 610, ridge 112, 212, 312, 412, 512, and/or 612, slab 114, 214, 314, 414, 514, and/or 614, and electrodes 120, 130, 140, 220, 230, 240, 320, 330, and/or 340.

Portions of slab 714 have been removed (or are otherwise omitted) in bend region 770. In the embodiment shown, slab 714 extends a distance d2 from the outside edge of ridge 712 in bend region. However, d2 may still be in the range discussed with respect to photonics device 100. The portion of slab 714 at the inner edge of the bend extends further from ridge 712 (e.g. distance d2'>d2). In some embodiments, d2' may extend significantly further than d2. Thus, photonics device 700 is analogous to photonics devices 300, 500, and 600. A thinned portion of slab 714 extends past d2 in the outside bend. The thinned portion physically connects to a thicker portion of slab 714 in the outside region. These portions of slab 714 may not adversely affect confinement of the optical mode in bend region 770 because of the significantly reduced thickness adjacent to d2. This asymmetry in slab 714 may facilitate fabrication of photonics device 700 because less TFLC may be removed in bend region 770. Consequently, bends may still be made tighter (i.e. have reduced radii of curvature) while mitigating losses.

Photonics device 700 shares the benefits of photonics device(s) 100, 200, 300, 400, 500, and/or 600. Removal of a portion of slab 714 in bend region 770 may improve confinement of the optical mode in bend region 770 and reduce optical losses. Thus, tighter bends may be used. Bends may be used to better match the velocities of the optical and electrode signals, improve modulation efficiency, mitigate optical losses, provide smaller photonics devices, and facilitate integration. Fabrication of photonics device 700 may be simplified, made more repeatable, and made more scalable through the use of photolithography. Electrodes (not shown) may include extensions that may reduce microwave losses, allow for a large electric field at ridge 712 and improve the propagation of the microwave signal through the electrodes. Thus, the use of TFLC photonics components may achieve improved performance, lower cost, higher yield, and/or improved scalability while reducing device size, facilitating scalability, and mitigating optical losses.

Figure 8A:
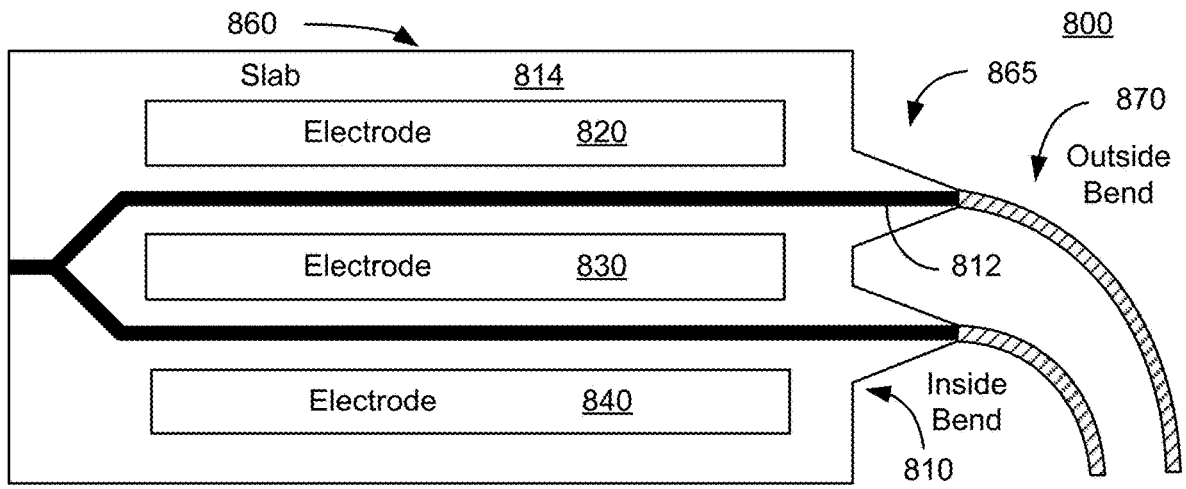
FIGS. 8A-8C depict an embodiment of a photonics device using electro-optic material(s) and that may have tighter bends.
Figure 8B:
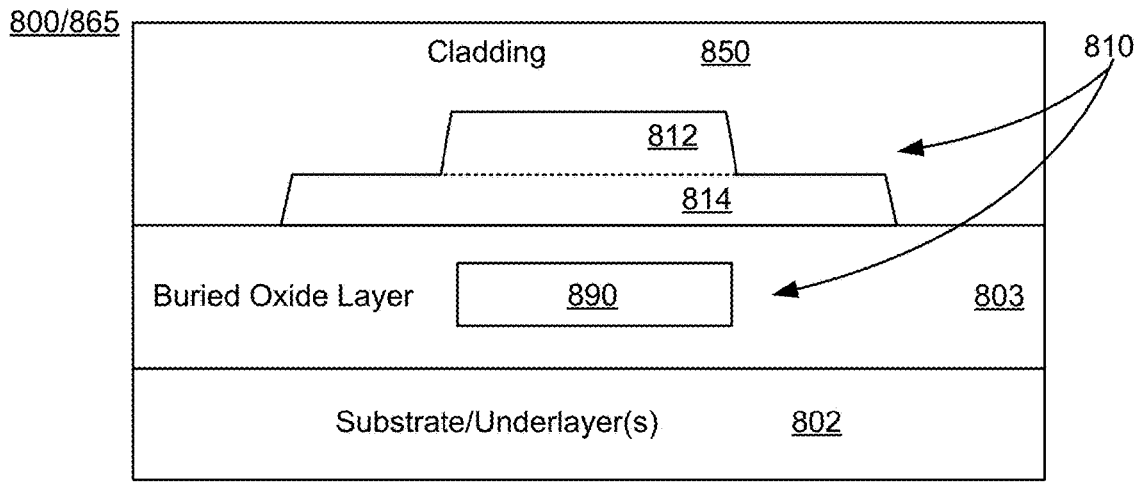
Figure 8C:
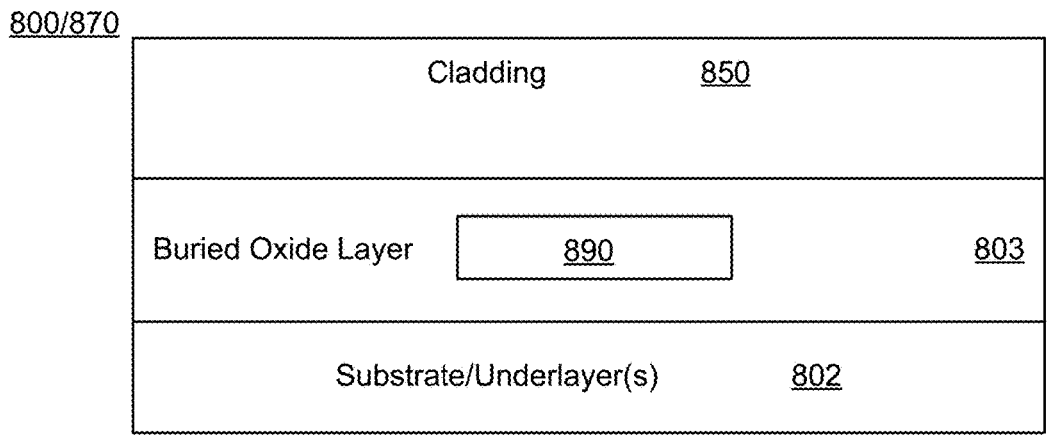

FIGS. 8A-8C depict an embodiment of photonics device 800 using electro-optic material(s) and that may have tighter bends. FIG. 8A depicts a plan view of photonics device 800. FIG. 8B depicts a cross-sectional view of photonics device 800 in transition region 865, FIG. 8C depicts a cross-sectional view of photonics device 800 in bend region 870. Photonics device 800 also includes modulation region 860 and other components analogous to those of photonics devices 100, 200, 300, 400, 500, 600, and/or 700. Photonics device 800 includes waveguide 810 having ridge 812 and slab 814 in combination with electrodes 820, 830, and 840 that are analogous to waveguide 110, 210, 310, 410, 510, 610, and/or 710, ridge 112, 212, 312, 412, 512, 612, and/or 712, slab 114, 214, 314, 414, 514, 614, and/or 714, and electrodes 120, 130, 140, 220, 230, 240, 320, 330, and/or 340.

In transition region 865, waveguide 810 transitions to another waveguide 890. Thus, waveguide 890 remains in bend region 870. Consequently, ridge 812 and, in the embodiment shown, slab 814 are removed in bend region 870. Waveguide 890 may include one or more of a TFLC material (e.g. TFLN and/or TFLT), silicon, silicon nitride and/or other dielectric waveguide materials that provide sufficient confinement to the optical mode in tight bending radii similar to that of the bending radii described herein. Although shown as below (closer to substrate 102) waveguide 110, in some embodiments, waveguide 890 may be above waveguide 110.

Photonics device 800 shares the benefits of photonics device(s) 100, 200, 300, 400, 500, 600, and/or 700. Transition to waveguide 890 in bend region 870 may improve confinement of the optical mode in bend region 870 and reduce optical losses. Thus, tighter bends may be used. Bends may be used to better match the velocities of the optical and electrode signals, improve modulation efficiency, mitigate optical losses, provide smaller photonics devices, and facilitate integration. Fabrication of photonics device 800 may be simplified, made more repeatable, and made more scalable through the use of photolithography. Electrodes (not shown) may include extensions that may reduce microwave losses, allow for a large electric field at ridge 812 and improve the propagation of the microwave signal through the electrodes. Thus, the use of TFLC photonics components may achieve improved performance, lower cost, higher yield, and/or improved scalability while reducing device size, facilitating scalability, and mitigating optical losses.

Figure 9:
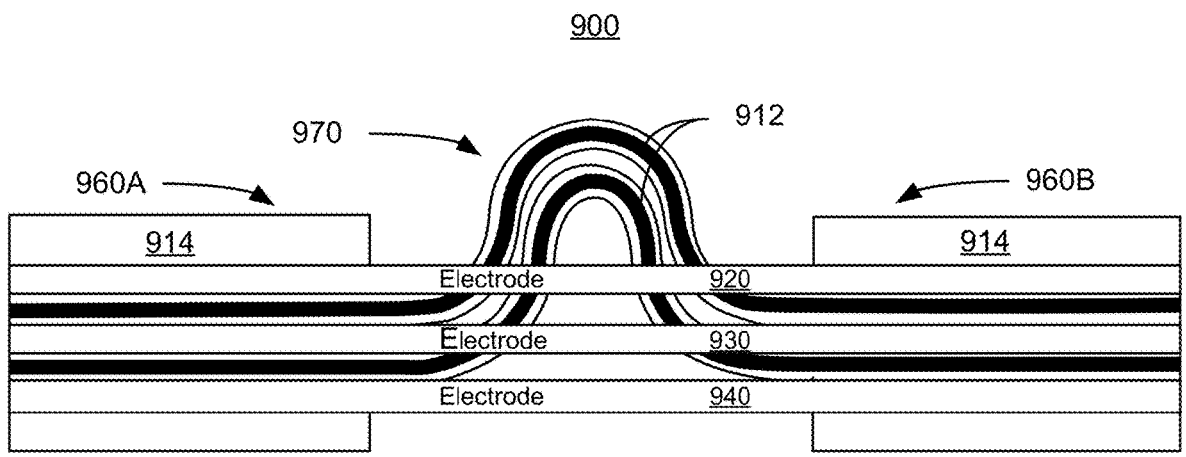
FIG. 9 depicts an embodiment of a photonics device using electro-optic material(s) and that may have tighter bends.

FIG. 9 depicts an embodiment of photonics device 900 using electro-optic material(s) and that may have tighter bends. FIG. 9 depicts a plan view of photonics device 900. Photonics device 900 also includes modulation regions 960A and 960B and other components analogous to those of photonics devices 100, 200, 300, 400, 500, 600, 700, and/or 800. Photonics device 900 includes waveguide 910 having ridge 912 and slab 914 in combination with electrodes 920, 930, and 940 that are analogous to waveguide 110, 210, 310, 410, 510, 610, 710, and/or 810, ridge 112, 212, 312, 412, 512, 612, 712, and/or 812, slab 114, 214, 314, 414, 514, 614, 714, and/or 814, and electrodes 120, 130, 140, 220, 230, 240, 320, 330, 340, 820, 830, and/or 840.

Photonics device 900 thus includes bend region 970 that has four approximately ninety degree bends. The path difference between ridge 912 and electrodes 920, 930, and 940 may be readily understood. Thus, bending region 970 may be used for velocity matching between the optical and electrode signals.

Photonics device 900 shares the benefits of photonics device(s) 100, 200, 300, 400, 500, 600, 700, and/or 800. Bend region 970 may have improved confinement of the optical mode in bend region 970 and reduced optical losses. Thus, tighter bends may be used. Bends may be used to better match the velocities of the optical and electrode signals, improve modulation efficiency, mitigate optical losses, provide smaller photonics devices, and facilitate integration. Fabrication of photonics device 900 may be simplified, made more repeatable, and made more scalable through the use of photolithography. Electrodes (not shown) may include extensions that may reduce microwave losses, allow for a large electric field at ridge 912 and improve the propagation of the microwave signal through the electrodes. Thus, the use of TFLC photonics components may achieve improved performance, lower cost, higher yield, and/or improved scalability while reducing device size, facilitating scalability, and mitigating optical losses.

Figure 10:
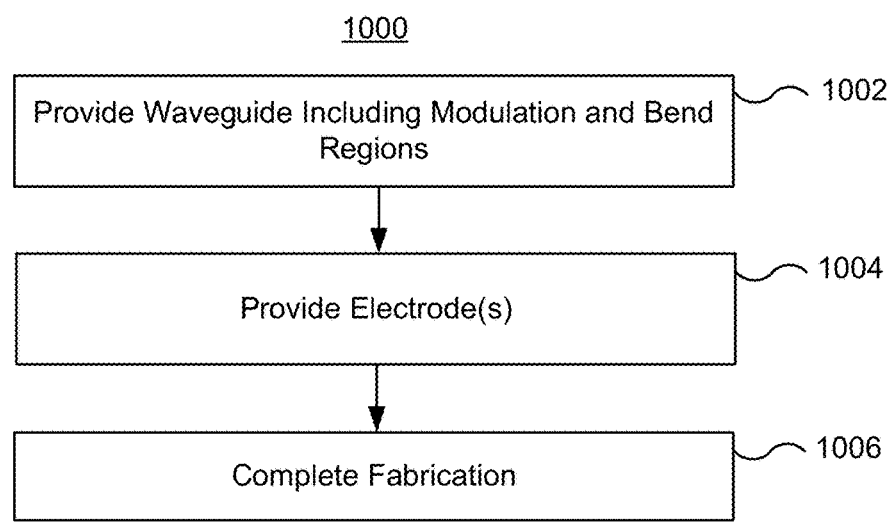
FIG. 10 is a flow chart depicting an embodiment of a method for providing a photonics device using electro-optic material(s) and that may have tighter bends.

FIG. 10 is a flow chart depicting an embodiment of method 1000 for providing a photonics device using electro-optic material(s) and that may have tighter bends. Method 1000 is described in the context of processes that may have sub-processes. Although described in a particular order, another order not inconsistent with the description herein may be utilized. Further, some processes may be performed in parallel and/or interleaved with portions of other processes. Although described in the context of a single device, multiple devices may be provided in parallel.

A waveguide configured for modulation and bend regions is provided, at 1002. In some embodiments, 1002 includes performing one or more etches using UV or DUV photolithography. At 1004, the electrode(s) are provided. For example, a mask may be provided and metallization plated. The electrodes formed at 1004 may or may not include extensions. Fabrication of the device may be completed, at 1006.

For example, referring to FIGS. 1A-1D, at 1002, waveguide 110 including ridge 112 and slab 114 is provided. Moreover, 1002 includes configuring waveguide 110 such that portions of slab 114 and, in some embodiments, ridge 112 are not present in bend region. At 1004, electrodes 120, 130, and 140 are formed.

Using method 1000, the benefits of the photonic devices described herein may be realized. For example, photonic devices having improved confinement of the optical mode in the bend region and reduced optical losses may be fabricated. Thus, tighter bends may be used and denser integration of the photonic device may be achieved. Bends may be used to better match the velocities of the optical and electrode signals, improve modulation efficiency, mitigate optical losses, provide smaller photonics devices, and facilitate integration. Fabrication of photonics devices may be simplified, made more repeatable, and made more scalable through the use of photolithography. Electrodes (not shown) may include extensions that may reduce microwave losses, allow for a large electric field at the ridge, and improve the propagation of the microwave signal through the electrodes. Thus, a TFLC photonics device having improved performance, lower cost, higher yield, improved scalability, reduces device size, and reduced optical losses may be provided.

Figure 11:
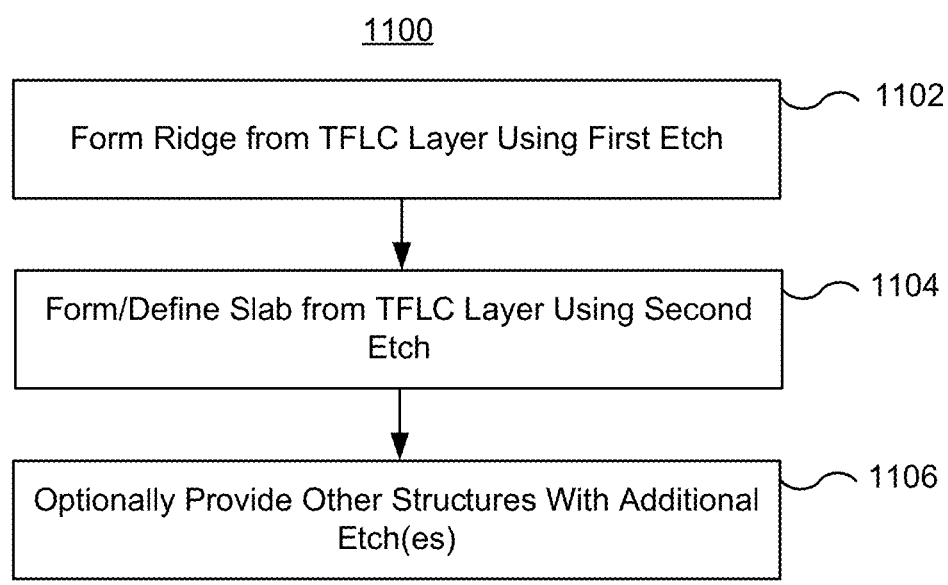
FIG. 11 is a flow chart depicting an embodiment of a method for providing a photonics device using electro-optic material(s) and that may have tighter bends.

FIG. 11 is a flow chart depicting an embodiment of method 1100 for providing a photonics device using electro-optic material(s) and that may have tighter bends. Method 1100 is described in the context of processes that may have sub-processes. Although described in a particular order, another order not inconsistent with the description herein may be utilized. Further, some processes may be performed in parallel and/or interleaved with portions of other processes. Although described in the context of a single device, multiple devices may be provided in parallel.

Method 1100 may be used in conjunction with a wafer having a TFLC electro-optic layer on a substrate. At 1102, a ridge is formed from the TFLC layer. 1102 may include covering the portion of the wafer corresponding to the ridge with a mask and performing a first etch process. The etch performed at 1102 may not etch through the TFLC layer.

At 1104, the slab may be defined. 1104 may include providing another mask covering the waveguide (i.e. the desired ridge and slab). Also in 1104, a second etch process is performed. In some embodiments, 1104 may be performed before 1102. Other structures, possibly using other etches, may also be provided at 1106. For example, a portion of the slab may be further thinned, a portion of the slab may be removed, and/or other features may be provided.

For example, at 1102, ridge 512 may be defined by a first etch. A region corresponding to ridge 512 may be covered in a mask and an etch performed. Thus, the height difference between ridge 512 and slab 514, t2, may be defined. At 1104, slab 514 may be defined. This may include covering ridge 512 and slab 514 with a mask defining the edges of slab 514 and performing at least one etch. For example, a portion of slab 514 may be removed, or thinned, at 1104. The mask may be removed. Additional etches may be performed. Thus, the desired configuration of waveguide 510 may be provided and the desired benefits of photonics devices 100, 200, 300, 400, 500, 600, 700, 800, and 900 achieved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A photonics device, comprising:
    at least one electrode; and
    a first waveguide and a second waveguide, the first waveguide including at least one electro-optic material, a ridge, and a slab, a portion of the first waveguide being proximate to the at least one electrode, the second waveguide including a bend, the ridge including a first side and a second side opposite to the first side, portions of the slab being proximate to the first side and the second side of the ridge in the portion of the first waveguide, a portion of the slab being omitted proximate to the second waveguide, the second waveguide including an other optical material, the first waveguide being optically coupled to the second waveguide such that an optical mode is transferred from the first waveguide to the second waveguide;
    wherein the slab is tapered proximate to the second waveguide to precondition the optical mode to negotiate the bend in the other optical material of the second waveguide.

2. The photonics device of claim 1, wherein the at least one electro-optic material includes at least one lithium-containing material.

3. The photonics device of claim 1, wherein the bend has a bending radius not exceeding thirty micrometers.

4. The photonics device of claim 3, wherein the bending radius does not exceed ten micrometers.

5. The photonics device of claim 1, wherein the portion of the slab that is omitted extends through the slab.

6. The photonics device of claim 1, wherein an optical loss through the bend does not exceed 0.5 dB for a ninety degree bend and a bend radius not exceeding twenty micrometers.

7. The photonics device of claim 6, wherein the optical loss through the bend does not exceed 0.25 dB for the ninety degree bend.

8. The photonics device of claim 1, wherein the portion of the slab that is omitted is configured such that a corresponding portion of the slab extends not more than one micrometer from the ridge.

9. The photonics device of claim 8, wherein the portion of the slab that is omitted is configured such that the corresponding portion of the slab extends not more than 500 nanometers from the ridge.

10. The photonics device of claim 1, wherein an additional portion of the first waveguide between the portion of the waveguide and the second waveguide including the bend is taper-free.

11. The photonics device of claim 1, wherein the portion of the slab omitted extends through the slab to form a slot between the ridge and an additional portion of the slab.

12. The photonics device of claim 1, wherein the slab is asymmetrically tapered.

13. A photonics device, comprising:
    a plurality of electrodes; and at least one waveguide including a first waveguide and a second waveguide the first waveguide including at least one thin film lithium-containing electro-optic material, the first waveguide including a ridge, and a slab, a portion of the first waveguide being between two electrodes of the plurality of electrodes, the second waveguide including a bend, the slab extending between the ridge and the two electrodes of the plurality of electrodes in the portion of the first waveguide, the bend having an inner region and an outer region, a portion of the slab being omitted proximate to the second waveguide, the second waveguide including an other optical material, the first waveguide being optically coupled to the second waveguide such that an optical mode is transferred from the first waveguide to the second waveguide;

wherein the slab is tapered proximate to the second waveguide to precondition the optical mode to negotiate the bend in the other optical material of the second waveguide.

14. The photonics device of claim 13, wherein the bend has a bending radius not exceeding twenty micrometers.

15. The photonics device of claim 13, wherein an optical loss through the bend does not exceed 0.25 dB for a ninety degree bend and a bending radius of not more than forty micrometers.

16. A method, comprising:

providing at least one electrode; and providing a first waveguide and a second waveguide, the first waveguide including at least one electro-optic material, a ridge, and a slab, a portion of the first waveguide being proximate to the at least one electrode, the second waveguide including a bend, the ridge including a first side and a second side opposite to the first side, portions of the slab being proximate to the first side and the second side of the ridge in the portion of the first waveguide, a portion of the slab being omitted proximate to the second waveguide, the second waveguide including an other optical material, the first waveguide being optically coupled to the second waveguide such that an optical mode is transferred from the first waveguide to the second waveguide;

wherein the slab is tapered proximate to the second waveguide to precondition the optical mode to negotiate the bend in the other optical material of the second waveguide.

17. The method of claim 16, wherein the providing the waveguide further includes:

forming the ridge from the at least one electro-optic material using a first etch; and providing the portion of the slab that is omitted using a second etch;

wherein the at least one electro-optic material includes at least one thin film lithium-containing material.

18. The method of claim 17, wherein the bend has a bending radius not exceeding twenty micrometers.

19. The method of claim 17, wherein the portion of the slab that is omitted extends through the slab.

* * * * *